(12) United States Patent
Malson et al.

(10) Patent No.: US 12,214,785 B2
(45) Date of Patent: Feb. 4, 2025

(54) VEHICLE LOCALIZATION TO MAP DATA

(71) Applicant: Aptiv Technologies AG, Schaffhausen (CH)

(72) Inventors: Steven G. Malson, Metamora, MI (US); James Nicholas Nickolaou, Clarkston, MI (US)

(73) Assignee: Aptiv Technologies AG, Schaffhausen (CH)

( * ) Notice: Subject to any disclaimer, the term of this patent is extended or adjusted under 35 U.S.C. 154(b) by 370 days.

(21) Appl. No.: 17/660,472

(22) Filed: Apr. 25, 2022

(65) Prior Publication Data
US 2023/0082106 A1    Mar. 16, 2023

Related U.S. Application Data

(60) Provisional application No. 63/277,260, filed on Nov. 9, 2021, provisional application No. 63/243,442, filed on Sep. 13, 2021.

(51) Int. Cl.
*B60W 30/12*    (2020.01)
*B60W 30/14*    (2006.01)
*B60W 60/00*    (2020.01)

(52) U.S. Cl.
CPC .......... *B60W 30/12* (2013.01); *B60W 30/143* (2013.01); *B60W 60/005* (2020.02);
(Continued)

(58) Field of Classification Search
None
See application file for complete search history.

(56) References Cited

U.S. PATENT DOCUMENTS 9,383,212 B2    7/2016  Dorum et al.
10,000,236 B2 *  6/2018  Otake ................. G05D 1/0212
(Continued)

FOREIGN PATENT DOCUMENTS

DE    102016112913 A1    1/2017

OTHER PUBLICATIONS

"Extended European Search Report", EP Application No. 22172607.8, Oct. 13, 2022, 9 pages.
(Continued)

*Primary Examiner* — Jonathan M Dager
(74) *Attorney, Agent, or Firm* — Harness, Dickey & Pierce, P.L.C.

(57) ABSTRACT

This document describes techniques for localizing a vehicle to map data, for example, to enable assisted driving and automated driving within a road. A road model builder is described that uses vehicle location data to determine its position relative to map data obtained from a provider, which can be different than the location data's source. Using the vehicle position, the road model builder maintains a current lane segment for the vehicle and its relative position within the current lane segment. Based on its relative position, the road model builder determines whether a transition to another lane segment is appropriate before setting the current lane segment to be the other lane segment. The current lane segment, when provided as an input to an assisted-driving or automated-driving system, can enable safer operation of the vehicle and use fewer computing resources than other systems.

18 Claims, 12 Drawing Sheets

(52) U.S. Cl.
CPC ..... *B60W 2552/30* (2020.02); *B60W 2552/53* (2020.02); *B60W 2555/60* (2020.02); *B60W 2556/40* (2020.02)

(56) References Cited

U.S. PATENT DOCUMENTS

| | | | | |
|---|---|---|---|---|
| 10,496,098 | B2* | 12/2019 | Zhu | G05D 1/0088 |
| 10,604,139 | B2* | 3/2020 | Oyama | B60K 35/10 |
| 10,678,262 | B2* | 6/2020 | Browning | G05D 1/0212 |
| 11,175,149 | B2* | 11/2021 | Jung | G08G 1/167 |
| 11,475,678 | B2* | 10/2022 | Myeong | G06V 20/588 |
| 11,529,956 | B2* | 12/2022 | Kim | B60W 50/082 |
| 11,541,889 | B2* | 1/2023 | Um | B60W 30/10 |
| 11,760,349 | B2* | 9/2023 | Chen | B60W 50/0098 701/26 |
| 2014/0358322 | A1 | 12/2014 | Ibrahim | |
| 2016/0107687 | A1* | 4/2016 | Yamaoka | B62D 15/025 701/41 |
| 2018/0189578 | A1* | 7/2018 | Yang | G01C 21/3635 |
| 2018/0339708 | A1* | 11/2018 | Geller | B60L 3/0015 |
| 2018/0341269 | A1* | 11/2018 | Lv | G01C 21/3407 |
| 2019/0047469 | A1* | 2/2019 | Nishiguchi | B60Q 1/40 |
| 2019/0315362 | A1* | 10/2019 | Um | B60W 50/10 |
| 2019/0318174 | A1* | 10/2019 | Miklos | G01C 21/3602 |
| 2020/0151611 | A1* | 5/2020 | McGavran | G06F 16/29 |
| 2020/0257301 | A1* | 8/2020 | Weiser | G08G 1/163 |
| 2021/0063200 | A1* | 3/2021 | Kroepfl | C03C 17/3644 |
| 2021/0182574 | A1* | 6/2021 | Park | G06V 20/588 |
| 2022/0144277 | A1* | 5/2022 | Hiramatsu | B60W 30/18163 |
| 2022/0212672 | A1* | 7/2022 | Xiao | G06V 20/588 |
| 2022/0219692 | A1* | 7/2022 | Taniguchi | B60W 30/12 |
| 2022/0292847 | A1* | 9/2022 | Kibayashi | G06V 20/588 |
| 2022/0379894 | A1* | 12/2022 | Itoh | G08G 1/16 |
| 2023/0140162 | A1* | 5/2023 | Malson | B60W 60/001 701/26 |
| 2023/0204386 | A1* | 6/2023 | Kitahara | G08G 1/09 701/450 |
| 2023/0341239 | A1* | 10/2023 | Ferencz | G06T 7/11 |
| 2023/0351887 | A1* | 11/2023 | Lengsfeld | G06V 10/82 |
| 2023/0373530 | A1* | 11/2023 | Kume | G08G 1/16 |
| 2024/0116504 | A1* | 4/2024 | Umeda | B60W 30/0956 |

OTHER PUBLICATIONS

Hansson, et al., "Lane-Level Map Matching based on HMM", IEEE Transactions on Intelligent Vehicles, Jan. 1, 2020, 11 pages.
Li, et al., "Lane-Level Map-Matching With Integrity on High-Definition Maps", 2017 IEEE Intelligent Vehicles Symposium, Jun. 11, 2017, pp. 1176-1181.

* cited by examiner

VEHICLE LOCALIZATION TO MAP DATA

CROSS-REFERENCE TO RELATED APPLICATIONS

This application claims the benefit of U.S. Provisional Patent Application No. 63/277,260, filed Nov. 9, 2021, and U.S. Provisional Patent Application No. 63/243,442, filed Sep. 13, 2021, the disclosures of which are incorporated by reference herein in their entireties.

BACKGROUND

Road-perception systems can provide vehicle-based systems with information about road conditions and road geometry, for example, to control an automobile on a roadway. Vehicles can use road-perception systems for a variety of vehicle-based systems that include: Automatic Cruise Control (ACC), Traffic-Jam Assist (TJA), Lane-Centering Assist (LCA), and L3/L4 Autonomous Driving on Highways (L3/L4). Some safety regulations require such vehicle-based systems to model the lanes of a roadway and localize the vehicle within the lanes. Existing road-perception systems can be too slow to reliably support safe driving decisions, whether automated or partially automated. These systems often have to repeatedly access map databases to obtain and process large segments of information (e.g., individual tiles or road segments) for performing vehicle localization procedures, which results in considerable latency in reporting accurate road positioning updates needed for vehicle-based systems. Addressing the latency of existing localization systems and techniques may require excessive computing resources or advanced equipment be deployed on a vehicle that can access map providers with sufficient frequency or process large map data sets with sufficient speed to support localization for enabling automated or assisted-driving decisions.

SUMMARY

This document describes techniques and systems for vehicle localizations to map data. For example, this document describes a method for localizing the position of a vehicle relative to map data. The map data can include a series of lane segment groups, lane segments, and lane lines for the road. The method includes providing an initial lane segment as an input to an assisted-driving system or an automated-driving system at least partially in control of the vehicle traveling on a road. Lane segments represent a portion of a lane of the road on which the vehicle is traveling. Lane segment groups include one or more lane segments for lanes with the same travel direction. The lane lines represent a lateral center of the lane segments.

The method also includes determining a position of the vehicle using location data. Based on the position of the vehicle and map data, a current lane segment for the vehicle is maintained and a relative position of the vehicle within the current lane segment. Based on the relative position of the vehicle within the current lane segment, a determination is made as to whether or not to transition the current lane segment to another lane segment. Responsive to determining to transition the current lane segment to the other lane segment, the method includes setting the current lane segment to be the other lane segment. The method also includes providing the current lane segment as the input to the assisted-driving system or the automated-driving system of the vehicle. In this way, the road model builder can perform vehicle localization to map data without excessive memory or processing resources.

This document also describes other operations of the above-summarized method and other methods set forth herein, as well as systems, processors, systems including processors, and/or means for performing these methods and other methods described in this document. This document also describes computer-readable storage media for storing instructions, when executed by one or more processors, cause the one or more processors to perform these methods and other methods described in this document.

This Summary introduces simplified concepts for localizing a vehicle to map data, which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of vehicle localization to map data are described in this document with reference to the following figures. The same numbers are used throughout the drawings to reference like features and components:

FIG. 3-1 illustrates an example map interface that can generate a road model based on map data according to techniques described in this disclosure;

FIG. 3-2 illustrates an example environment in which a map interface can generate a road model based on map data according to techniques described in this disclosure;

FIG. 3-3 illustrates another example environment in which a map interface can generate a road model based on map data according to techniques described in this disclosure;

FIG. 4-1 illustrates an example flowchart of a road model builder to localize a vehicle to map data according to techniques described in this disclosure;

FIG. 4-2 illustrates an example flowchart of a road model builder to localize a vehicle to map data according to techniques described in this disclosure;

FIGS. 7-1 through 7-3 illustrate another example flowchart of software execution to crawl lanes that can be implemented according to techniques in this disclosure.

DETAILED DESCRIPTION

Overview

Figure 1:
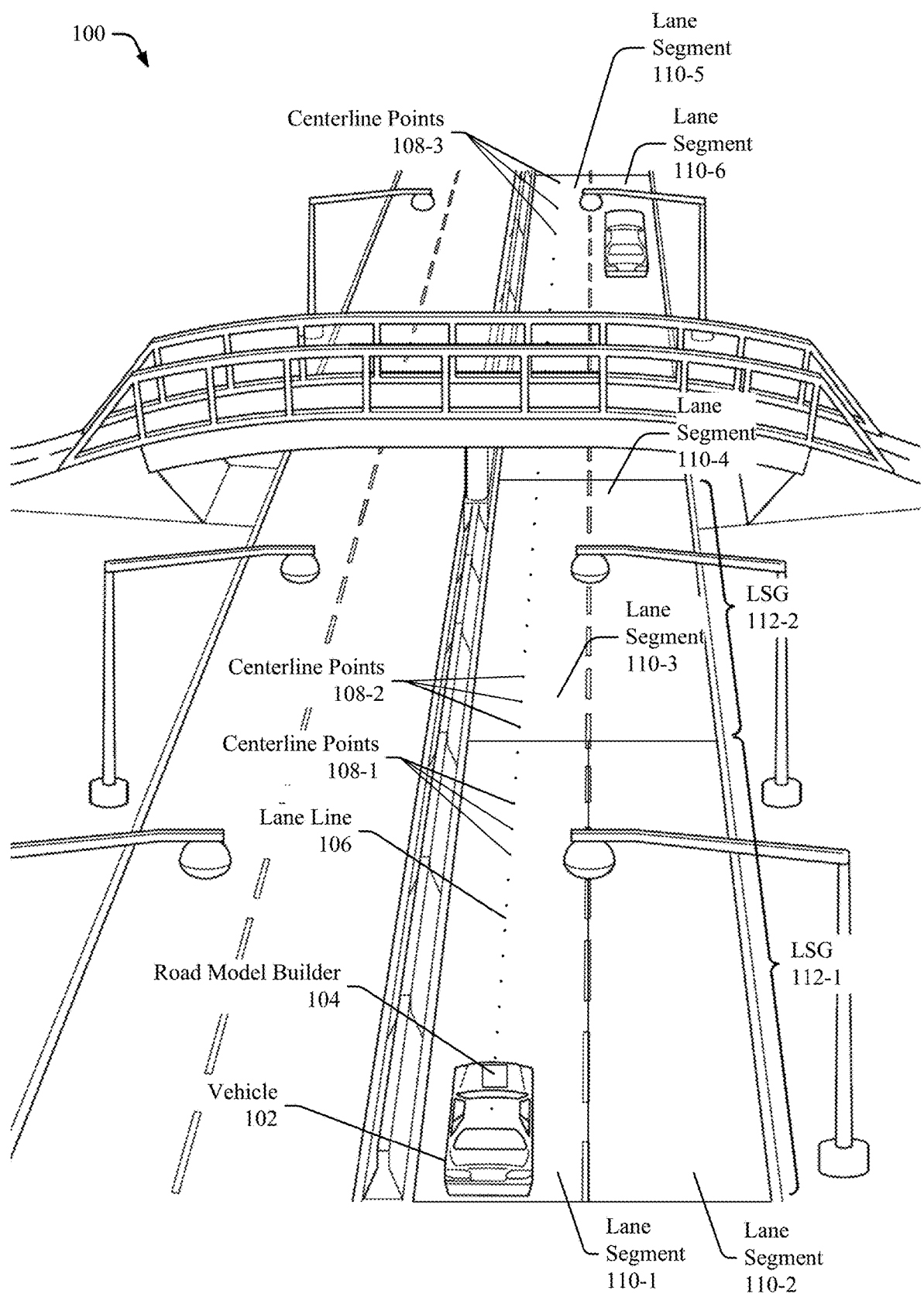
FIG. 1 illustrates an example environment in which a road model builder that can localize a vehicle to map data can be implemented according to techniques described in this disclosure.

Road model builders are an important technology for assisted-driving and autonomous-driving systems. For example, some driving systems (e.g., Level 2, Level 3, or Level 4 systems) and some safety standards (e.g., Safety of the Intended Functionality (SOTIF) of a system (ISO/PAS 21448:2019 "Road vehicles—Safety of the intended functionality")) rely on a road model to model the lanes, the lane type, and the roadway itself and localize a vehicle relative to the road model.

Some road models exist to define road information with fairly accurate lane geometry data for use by advanced driver-assistance systems (ADAS), including the Navigational Data Standard (NDS) and the Advanced Driver-Assistance Systems Interface Specification (ADASIS). These road models are generally not optimized for cloud-to-vehicle connectivity and can have particular software architecture requirements that result in overly complex software. For example, some of these road models localize and transform map data into the ADASIS format. The map data is then transmitted to a second software module to reconstruct the map data and provide it to the ADASIS features. This transformation process introduces significant overhead in the marshaling and transmission of map data. This type of road model localization can be too computationally complex to implement across a wide range of vehicle classes and categories. For example, in some instances only luxury or more-expensive vehicles include sufficient computing resources that may be necessary to reliably obtain and process updates from a map provider with sufficient frequency and speed to support real-time driving decisions.

In contrast, this document describes less-complex, but still accurate localization techniques for defining a position of a vehicle relative to map data as the vehicle moves through different parts of a road. For example, these techniques can query for, and in response to receiving, maintain (e.g., cache, preserve, store) only the road geometry data conveyed in the map data that is necessary to complete the vehicle localization process at a current moment in time, as opposed to every past, present, or future moment as may be done by some existing road models. In this way, the described techniques and systems can reduce the complexity of memory, processing, wireless communication, or other computing requirements to implement the described techniques on a wide range of vehicles. In addition, unnecessary map data for performing immediate localization on a roadway is kept in cloud or remote computing resources, thereby reducing an amount of map data transferred to the vehicle and better supporting road segment management (e.g., lane changes, lane position changes) at a granular level. For example, if at a bridge construction, the highway lane lines are recently repainted for 200 meters, with traditional approaches a complete tile of map data is downloaded to the vehicle, which can result in the transfer of a large amount (e.g., about 95%) of redundant map data to the vehicle that the vehicle already maintained from a previous receipt of map data. The described techniques and systems in this disclosure push to the vehicle only the relevant portions of the map data (e.g., one or two lane segment groups) containing sufficient information to make a change in lane segments, lane lines, or lane segment groups, which can include as little as only the data for portions of the road where the lane markings have changed (e.g., about 5% of the tile).

For example, this document describes techniques for localizing a vehicle to map data, for example, to enable assisted driving and automated driving within a road. A road model builder is described that uses vehicle location data to determine its position relative to map data obtained from a provider, which can be different than the location data's source. Using the vehicle position, the road model builder maintains a current lane segment for the vehicle and its relative position within the current lane segment. Based on its relative position, the road model builder determines whether a transition to another lane segment is appropriate before setting the current lane segment to be the other lane segment. The current lane segment, when provided as an input to an assisted-driving or automated-driving system, can enable safer operation of the vehicle and use fewer computing resources than other systems.

This section describes just one example of how the described techniques and systems can localize vehicles using map data. This document describes other examples and implementations.

Example Operating Environment

FIG. 1 illustrates an example environment 100 in which a road model builder 104 that can localize a vehicle 102 to map data can be implemented according to techniques described in this disclosure. FIG. 1 illustrates the road model builder 104 of a system (not shown) implemented within the vehicle 102. The vehicle 102 is traveling or is going to travel along a path on a roadway. The roadway includes several lanes, with the lanes represented by lane lines 106, centerline points 108, lane segments 110, and lane segment groups (LSGs) 112 by the road model builder 104.

The lane segments 110 represent portions of a roadway lane. For example, the lane segments 110-1, 110-3, and 110-5 represent portions of the current lane in which the vehicle 102 is traveling. One or more lane segments 110 with the same travel direction are included in an LSG 112. For example, the LSG 112-1 includes the lane segments 110-1 and 110-2. The LSG 112-2 includes the lane segments 110-3 and 110-4. The LSGs 112 are generally portions of a group of lanes in the same travel direction, that do not split, and with unchanging lane markers. The LSGs 112 may include a plurality of lines (e.g., vectors of points, lane markers). In some implementations, the LSGs 112 may include a predetermined origin. The origins can be centered laterally in the LSGs 112 and at the beginning of each LSG 112. The locations of the origins relative to the LSGs 112 may vary without departing from the scope of this disclosure.

The lane segments 110 include lane lines 106 that represent the lateral center of the lane segments 110. The lane lines 106 include an array of multiple centerline points 108. The centerline points 108 are organized or associated with a specific lane segment 110. For example, the lane segments 110-1, 110-3, and 110-5 are associated with the centerline points 108-1, 108-2, and 108-3, respectively.

Although illustrated as a car, the vehicle 102 can represent other types of motorized vehicles (e.g., a motorcycle, a bus, a tractor, a semi-trailer truck, or construction equipment). In general, manufacturers can mount or install the road model builder 104 to any moving platform that can travel on the roadway.

In the depicted environment 100, one or more sensors (not illustrated) are mounted to, or integrated within, the vehicle 102. The road model builder 104 uses data from the sensors to localize the vehicle 102 to map data (not illustrated). By representing the map data in terms of the lane lines 106, centerline points 108, lane segments 110, and LSGs 112, the road model builder 104 can represent the map data associated with roadways independent of various map providers. In addition, the road model builder 104 can use this map data within efficient localization techniques and systems to handle sparse map data to improve the processing and memory requirements for vehicle localization. This document describes the components and operations of the road model builder 104 in greater detail with respect to FIG. 2.

Example Architecture

Figure 2:
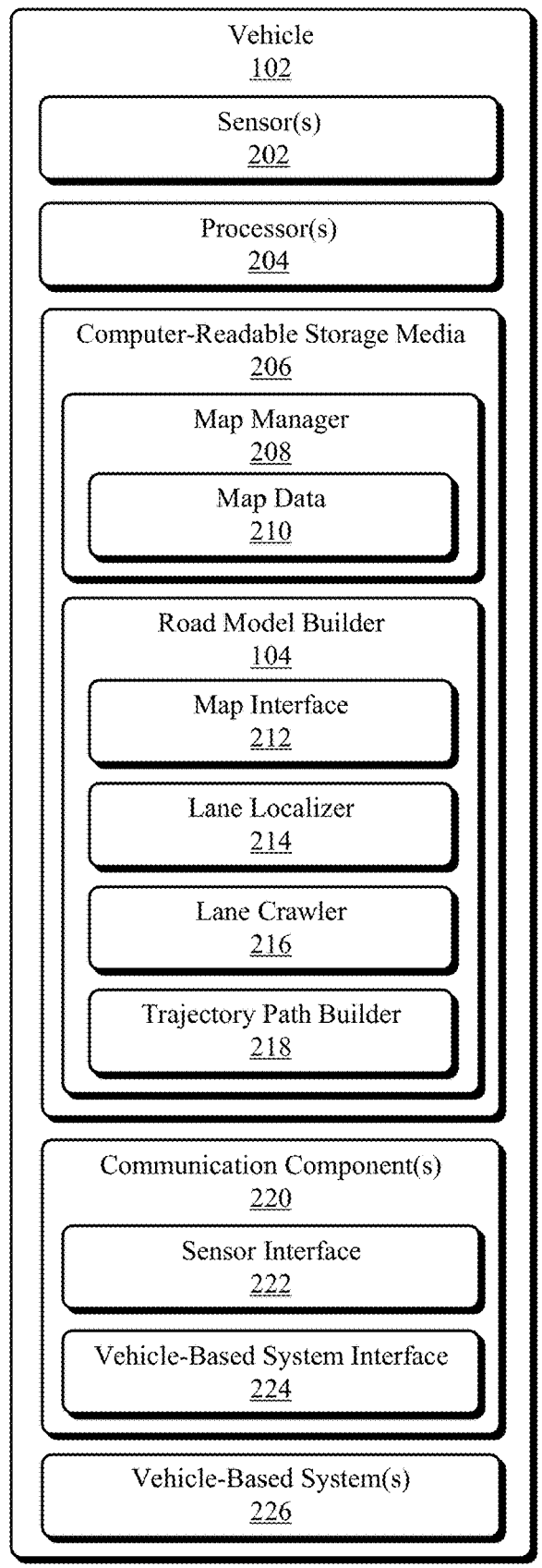
FIG. 2 illustrates an example system with a road model builder that can localize a vehicle to map data according to techniques described in this disclosure.

FIG. 2 illustrates an example system with the road model builder 104 that can localize the vehicle 102 to map data 210 according to techniques described in this disclosure. The vehicle 102 includes one or more sensors 202, one or more processors 204, computer-readable storage media (CRM) 206, one or more communication components 220, and one or more vehicle-based systems 226.

The sensors 202 provide input data to the road model builder 104. The sensors 202 can include a camera, a radar system, a global positioning system (GPS), a global navigation satellite system (GNSS), a lidar system, an inertial measurement unit (IMU), or any combination thereof. The camera can take still images or videos of the roadway. The radar system or the lidar system can use electromagnetic signals to detect objects in the roadway or features of the roadway. The GPS or GNSS can determine the position and/or heading of the vehicle 102. The IMU can measure the acceleration and angular velocity of the vehicle 102 along one or more axes. The vehicle 102 can include additional sensors to provide input data to the road model builder 104 regarding the roadway. The road model builder 104 can also obtain input data from external sources (e.g., nearby vehicles, nearby infrastructure, the internet) using vehicle-to-everything (V2X) or cellular communication technology.

The processor 204 can include, as non-limiting examples, a system on chip (SoC), an application processor (AP), an electronic control unit (ECU), a central processing unit (CPU), or a graphics processing unit (GPU). The processor 204 may be a single-core processor or a multiple-core processor implemented with a homogenous or heterogenous core structure. The processor 204 may include a hardware-based processor implemented as hardware-based logic, circuitry, processing cores, or the like. In some aspects, functionalities of the processor 204 and other components of the road model builder 104 are provided via an integrated processing, communication, and/or control system (e.g., SoC), which may enable various operations of the vehicle 102 in which the system is embodied.

The CRM 206 described herein excludes propagating signals. The CRM 206 may include any suitable memory or storage device such as random-access memory (RAM), static RAM (SRAM), dynamic RAM (DRAM), non-volatile RAM (NVRAM), read-only memory (ROM), or Flash memory useable to store device data (not illustrated) and the map data 210 of the road model builder 104 or a map manager 208.

The processor 204 executes computer-executable instructions stored within the CRM 206. As an example, the processor 204 can execute the map manager 208 to process and access the map data 210 or the road model builder 104 to localize the vehicle 102 to the map data 210.

The map manager 208 includes the map data 210. The map manager 208 can store the map data 210, process updated map data received from a remote source, and retrieve portions of the map data 210 for the road model builder 104. The map data 210 can include information about the lanes, speed limit, traffic control devices, and other details associated with roadways. The road model builder 104 can associate road attributes to associated lane segment groups 112, lane segments 110, and/or lane lines 106. For example, the road model builder 104 can associate speed limits to lane segments 110, road curvature to lane lines 106 or centerline points 108, and stop signs to lane segment groups 112. In the depicted implementation, the map manager 208 is illustrated as being located on or within the vehicle 102. In other implementations, the map manager 208 or another implementation of the map manager 208 can be located remote from the vehicle 102 (e.g., in the cloud or on a remote computer system) and provide a subset of the map data 210 to the vehicle 102 and the road model builder 104 as needed to perform the described localization operations.

Similarly, the processor 204 can execute the road model builder 104 to localize the vehicle 102 to the map data 210. The road model builder 104 can include a map interface 212, a lane localizer 214, a lane crawler 216, and a trajectory path builder 218. The map interface 212 can generate, using the map data 210, a road model of the roadway that includes the lane lines 106, centerline points 108, lane segments 110, LSGs 112, and other landmark data. The lane localizer 214 can use the map data 210 to localize the vehicle 102 to a specific lane segment 110 and LSG 112 defined by the road model. The lane crawler 216 can determine whether to transition the vehicle 102 to an adjacent lane segment or a next lane segment. In this way, the lane crawler 216 can continually update the position of the vehicle 102 relative to the map data 210 and the road model. The trajectory path builder 218 can determine a predicted or proposed travel path for the vehicle 102 based on the road model and the output of the lane crawler 216.

The communication components 220 can include a sensor interface 222 and a vehicle-based system interface 224. The sensor interface 222 and the vehicle-based system interface 224 can transmit data over a communication bus of the vehicle 102, for example, when the individual components of the map manager 208 and the road model builder 104 are integrated within the vehicle 102.

The processor 204 can also receive, via the sensor interface 222, measurement data from the sensors 202 as input to the road model builder 104. As an example, the processor 204 can receive image data or video data from a camera via the sensor interface 222. Similarly, the processor 204 can send, via the sensor interface 222, configuration data or requests to the sensors 202.

The vehicle-based system interface 224 can transmit road model data to the vehicle-based systems 226 or another component of the vehicle 102. In general, the road model data provided by the vehicle-based system interface 224 is in a format usable by the vehicle-based systems 226. In some implementations, the vehicle-based system interface 224 can send information to the road model builder 104, including, as a non-limiting example, the speed or heading of the vehicle 102. The road model builder 104 can use this information to configure itself appropriately. For example, the road model builder 104 can adjust, via the sensor interface 222, a frame rate or scanning speed of one or more sensors 202 based on the speed of the vehicle 102 to maintain performance of the road model builder 104 under varying driving conditions.

The vehicle-based systems 226 can use data from the road model builder 104 to operate the vehicle 102 on the roadway. The vehicle-based systems 226 can include an assisted-driving system and an autonomous-driving system (e.g., an Automatic Cruise Control (ACC) system, Traffic-Jam Assist (TJA) system, Lane-Centering Assist (LCA) system, and L3/L4 Autonomous Driving on Highways (L3/L4) system). Generally, the vehicle-based systems 226 use the road model data provided by the road model builder 104 to perform a function. For example, the assisted-driving system can provide automatic cruise control and monitor for the presence of an object (as detected by another system on the vehicle 102) in the lane in which the vehicle 102 is traveling. In this example, the road model data from the road model builder 104 identify the lane segments 110. As another example, the assisted-driving system can provide alerts when the vehicle 102 crosses a lane marker.

The autonomous-driving system may move the vehicle 102 to a particular location on the roadway while avoiding collisions with objects detected by other systems (e.g., a radar system, a lidar system) on the vehicle 102. The road model data provided by the road model builder 104 can provide information about the location of the lanes and uncertainty in the location of the lanes to enable the autonomous-driving system to perform a lane change or steer the vehicle 102.

Road Model Generation

Figures 1, 3:
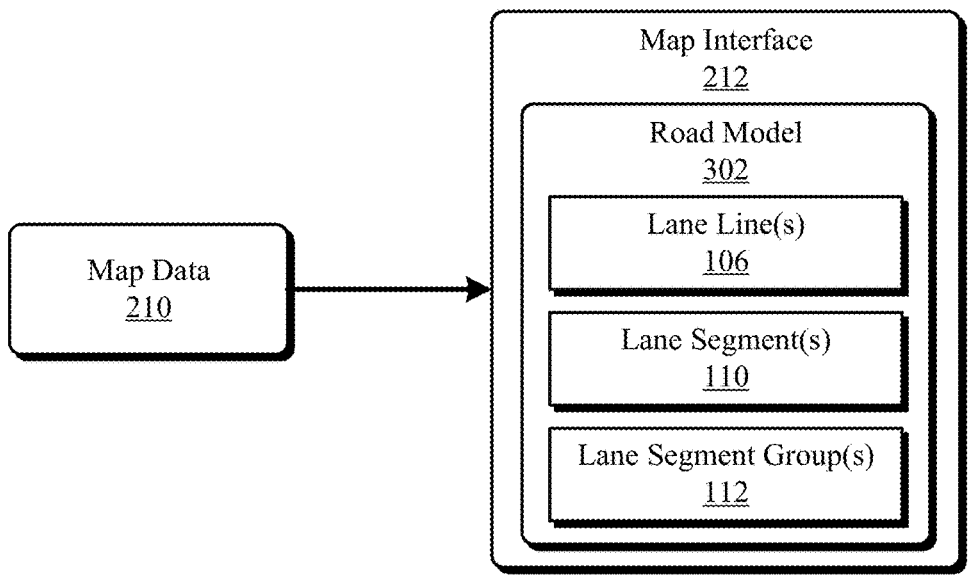
Figures 2, 3:
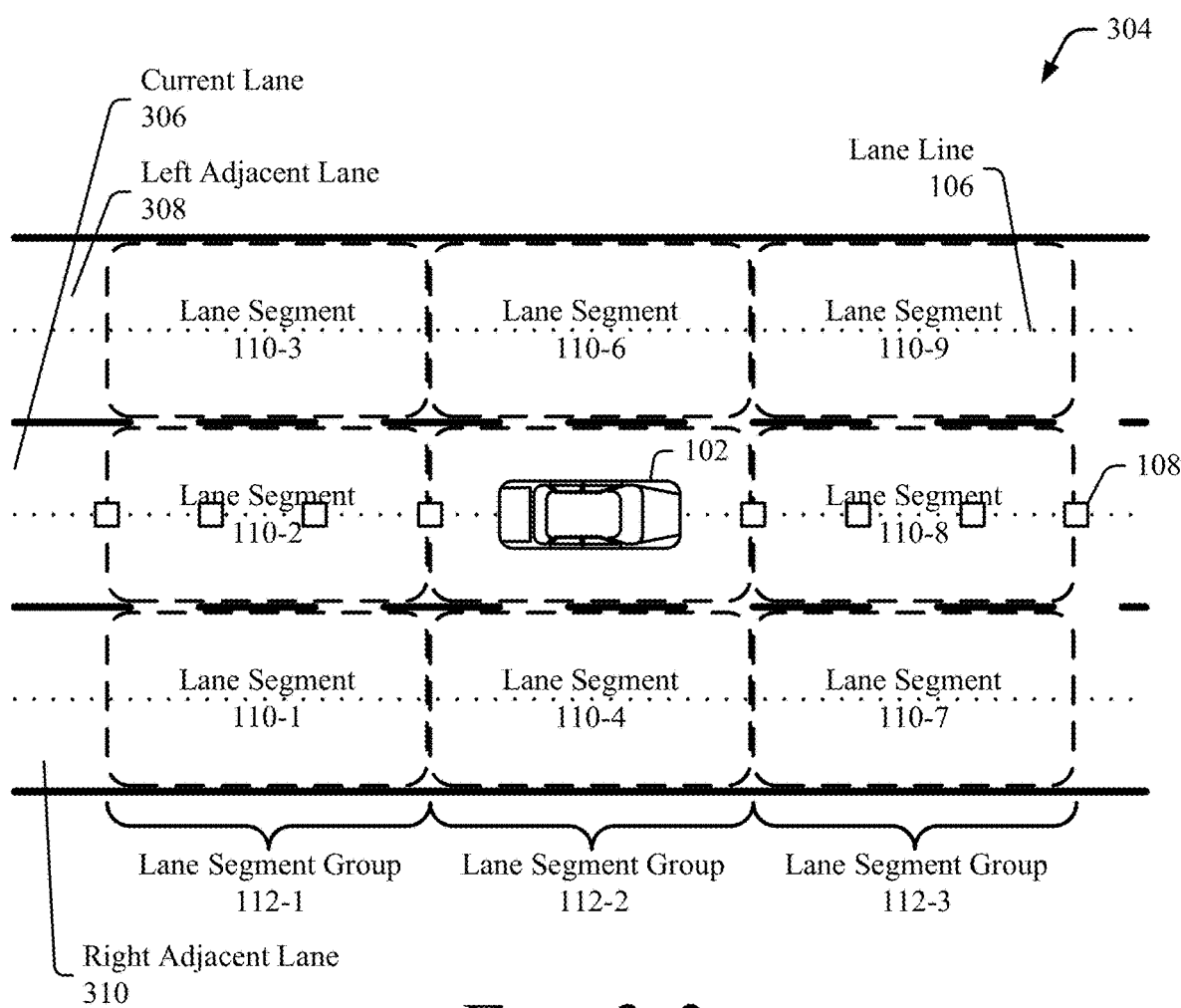
Figure 3:
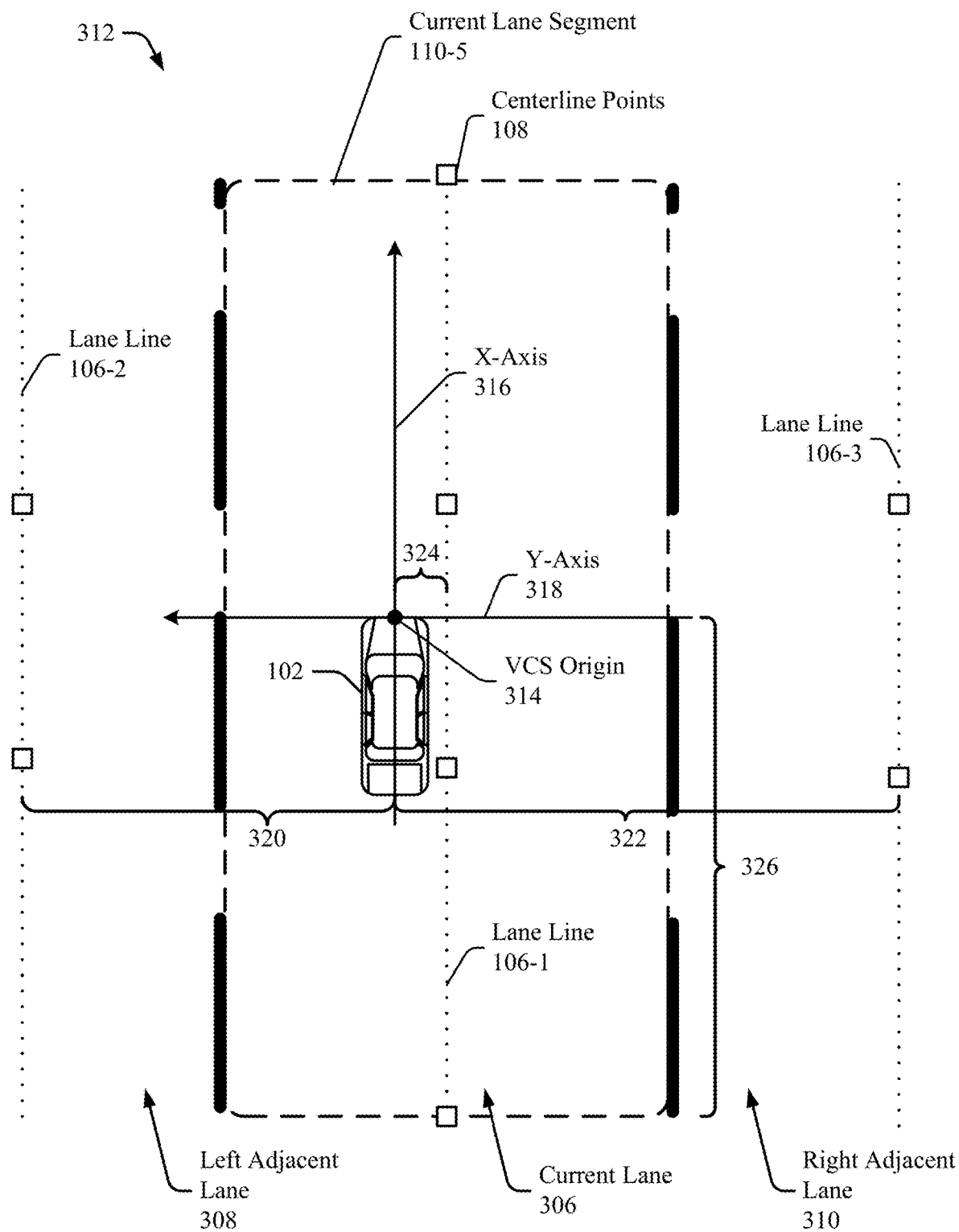

FIG. 3-1 illustrates an example map interface that can generate a road model based on map data according to techniques described in this disclosure. The map interface 212 can use the map data 210 to build a road model 302. In particular, the map interface 212 can transform the map data 210 into a common road model 302 to minimize or eliminate any software requirements of a provider of the map data 210. The map interface 212 can also translate the map data 210 to a more efficient format for the road model builder 104 to minimize the storage and processing requirements on the vehicle 102 or minimize the amount of map data 210 needed to be obtained from a remote source (e.g., the cloud) when map data has been updated. In some implementations, the map interface 212 or another implementation of the map interface 212 can be located remote from the vehicle 102 (e.g., in the cloud or on a remote computer system) and provide a subset of the map data 210 or the road model 302 to the vehicle 102 and the road model builder 104 as needed to perform the described localization techniques.

The road model 302 generated by the map interface 212 includes one or more lane segment groups 112, one or more lane segments 110, and one or more lane lines 106. The road model 302 can assign a globally unique identifier to the lane segment groups 112, the lane segments 110, and/or the lane lines 106.

A lane segment group 112 includes at least one lane segment 110 that represents road geometry for the roadway on which the vehicle 102 is traveling. Lane segment groups 112 are generally a grouping of adjacent lane segments 110 of a roadway for a single traveling direction. For example, and as illustrated in FIG. 3-2, the lane segment group 112-1 includes lane segments 110-1, 110-2, and 110-3. The lane segment group 112 can include a list or array of references to the lane segments 110 within the particular lane segment group 112. The list or array can begin with the right-most lane segment 110 and indicate the remaining lane segments 110 from right to left (e.g., lane segments 110-1, 110-2, and 110-3). The road model 302 can assign a unique identification to each lane segment group 112, which is used as a key to associate each lane segment 110.

Each lane segment group 112 also includes a geographical origin at a median of the lane lines 106 to allow the road model 302 to use relative distances for other aspects or characteristics and maintain millimeter-level precision and reduce the size of the road model 302. The map interface 212 can use coordinates representing the position of the vehicle 102 on the earth. As one example, the map interface 212 can use the median latitude and longitude values between the points of the lane line 106 as the origin for the lane segment group 112. The map interface 212 can also identify bounds for each lane segment group 112 using the latitude and longitude values or other coordinate values. For example, the bounds of a lane segment group 112 can include the minimum and maximum latitude and longitude values representing a rectangle bounding the lane segments 110 of the lane segment group 112.

The lane segment groups 112 can also identify the next lane segment group 112 (e.g., the lane segment group 112-2 can be identified as the next lane segment group 112 when the current lane segment group 112 is the lane segment group 112-1). The map interface 212 can use a list or array of references to identify the next lane segment groups 112. The list can include no values if the road is ending, a single value if the road continues, and multiple values if one or more lanes split.

The lane segment group 112 can also include a version identifier that allows for granular and efficient change management of the map data 210. The map interface 212 can use the following notation to identify the lane segment group 112 and its version: {LSG_Id}v{LSG_Version}. For example, updates to the map data 210 for construction zones can be targeted to specific lane segments 110 or lane segment groups 112 to optimize the amount of data transferred to the vehicle 102. The lane segment group 112 can also include type data. For example, the type data can indicate the form of way, road class, and other indicators for the lane segment group 112 (e.g., intersection, highway, highway ramp, parking area, right-hand drive).

The map interface 212 can apply several rules in grouping the lane segments 110 into the lane segment groups 112. For example, the map interface 212 can require a lane segment group 112 to maintain a constant number of lanes. As a result, the map interface 212 can require a transition between consecutive lane segment groups 112 at lane mergers, lane splits, or intersections that result in the addition or subtraction of a lane. The lane segment group 112 can indicate the number of lanes (e.g., NumLanes) included in the lane segment group 112.

As another example, the map interface 212 can limit the maximum length of a lane segment group 112. For example, the lane segment group 112 can indicate its length in meters from the first to last centerline point 108 in the right-most lane. The length can be calculated by summing the Euclidean distance between the centerline points 108 in a particular lane (e.g., the right-most lane). Although the distance between centerline points is shorter on curves, the Euclidean approach introduces an acceptable level of error without the map interface 212 needing to use more computationally intensive methods to calculate the length of a lane segment group 112. In one implementation, the map interface 212 can limit the maximum length of lane segment groups 112 to 500 meters, resulting in a minimum of eight lane segment groups 112 for a four (4) kilometer road horizon ahead of the vehicle 102. It is generally more efficient for the road model builder 104 to append a single lane segment group 112 to the horizon at a time and lengths greater than 500 meters, as this can result in a more-complex horizon building approach.

The map interface 212 can also include additional information associated with the lane segment groups 112 that is provided to the vehicle-based systems 226. A lane segment group 112 can indicate whether automated driving is enabled for that lane segment group, which allows automated-driving systems to dynamically disable operations for individual lane segment groups 112 via updates to the map data 210 from the cloud. The lane segment group 112 can also indicate the speed limit for the lane segments 110 within the lane segment group 112 (assuming the speed limit is the same for each lane segment 110) or a desired speed for the vehicle 102 to travel on the associated lane segments 110. Similarly, the lane segment group 112 can identify the measurement units used for speed values (e.g., miles-per-hour (MPH), kilometers-per-hour (KPH), meters-per-second (m/s)).

The lane segment groups 112 can also indicate a list or array of references to landmarks associated with the lane segment group 112. The landmarks can be located relative to the origin for the associated lane segment group 112. Landmarks can be a container or identifier for different types of objects along the road to support the vehicle-based systems 226. The landmarks can indicate the following attributes:

- LSG_Ref—providing a reference to the lane segment group 112 to which the landmark is anchored;
- Type—identifying the type of landmark for a road feature (e.g., speed limit signs, stop signs, identifiers for curve entry and exists, parking spots);
- LaneNum—indicating the specific lane or lane segment 110 with which the landmark is associated (e.g., if the value is 0, then the landmark applies to the entire lane segment group 112);
- Lane_Offset—indicating the offset or distance (e.g., in millimeters) traveled along the lane segment 110 relative to the first centerline point;
- Northing—indicating the relative distance along a y-axis from the origin of the lane segment group 112 to specify the location of the landmark;
- Easting—indicating the relative distance along an x-axis from the origin of the lane segment group 112 to specify the location of the landmark;
- IsLeft—indicating whether the landmark is on the left based on the direction of travel for the lane segment group 112 (e.g., this field may be used to indicate whether parking spots are on the left or right);
- IsRight—indicating whether the landmark is on the right based on the direction of travel for the lane segment group 112;
- Points—supporting the addition of a list or array of points to model objects with splines;
- Radar_Points—indicating additional data for a radar reference grid (e.g., radar data can include a consolidated radar map used by radar-based localization to localize the position of the vehicle 102);
- Parking Area—indicating additional data for a parking area (e.g., parking spot geometry and type); and
- Time_Constraint—indicating time constraints if the landmark possesses different attributes based on time of day or week.

Lane segment 110 represents a specific portion of a lane of the road. The map interface 212 can use the identifier for the lane segment group 112 and the lane number to identify a particular lane segment 110 (e.g., LSG_ID-Lane_ID). Lane numbers generally start with one (1), which indicates the right-most lane, and increment by one until the left-most lane is identified. The current lane segment 110 can be identified as the lane segment 110 in which the origin of the vehicle 102 is located.

The lane segments 110 can also include links or references to the next lane segments 110 and a list or array of all the lane lines 106. For example, the lane segments 110 can include one or more of the following attributes:

- ID—identifying the associated lane segment group 112;
- Version—identifying the version of the associated lane segment group 112;
- LaneNum—identifying the lane segment 110 from the other lane segments 110 in the associated lane segment group 112;
- Type—identifying the type of lane for each lane if different within the lane segment group 112;
- Speed_Limit—identifying the speed limit for the associated lane segment 110 if the speed limit is constant for the specific lane segment 110;
- Desired_Speed—identifying the desired speed for the vehicle 102 to travel the lane segment 110;
- Speed_UOM—indicating the unit of measure used for the speed values (e.g., MPH, KPH, m/s);
- Lane_Line_Points—identifying a list or array of geometric points for the lane line 106 relative to the origin of the lane segment group 112 (e.g., in millimeter precision); and
- Next_Lane_Segments—identifying a list or array of references to the next lane segments 110; if the lane splits with multiple next lane segments 110, a path attribute indicates to follow the left, center, or right paths.

The lane lines 106 include a list or array of centerline points 108 for a particular lane segment 110. The centerline points 108 are generally relative distances from the origin of the lane segment group 112. For example, the map interface 212 can use x and y coordinates to represent the position of centerline points 108 on a map.

In some implementations, the road model 302 can include a first centerline point 108 for the lane line 106 that represents the start of the lane segment 110. The road model 302 can also include an end centerline point 108 for the lane line 106 that represents the end of the lane segment 110. The road model 302 can space the centerline points 108 in-between the first centerline point 108 and the end centerline point 108 with a distance that is a function of the inverse curvature of the lane line 106. A curve with the smallest radius can result in centerline points 108 spaced apart by a meter or some other relatively small distance. Straight roads with no curvature can result in centerline points 108 spaced apart by greater distances (e.g., 100 meters apart if on an urban road or 500 meters apart on a highway).

FIG. 3-2 illustrates an example environment 304 in which the map interface 212 can generate the road model 302 based on map data 210 according to techniques described in this disclosure. The map interface of FIG. 3-2 can be the map interface 212 of FIG. 2 and FIG. 3-1.

In the environment 304, the vehicle 102 is traveling on a road with three lanes with the same traffic direction (e.g., eastward). In particular, the road includes a current lane 306 in which the vehicle 102 is traveling. The road also includes a left adjacent lane 308 to the left of the current lane 306 and a right adjacent lane 310 to the right of the current lane 306.

The map interface 212 generates the road model 302 for the road. In the depicted illustration, the road model 302 includes lane segment groups 112-1, 112-2, and 112-3. The lane segment group 112-1 includes lane segments 110-1, 110-2, and 110-3. The lane segment group 112-2 includes lane segments 110-4, 110-5, and 110-6. The lane segment group 112-3 includes lane segments 110-7, 110-8, and 110-9. The lane segments 110 include the lane lines 106, which are generated from an array of centerline points 108. In the depicted implementation, each lane segment 110 includes four centerline points 108: one at the beginning of the respective lane segment 110, one at the end of the respective lane segment 110, and two equally spaced between the other two centerline points 108. In other implementations, the lane line 106 for the lane segments 110 can include fewer or additional centerline points 108. In yet other implementations, the lane lines 106 do not include the same number of centerline points 108 for each lane segment 110.

FIG. 3-3 illustrates another example environment 312 in which the map interface 212 can generate the road model 302 based on map data 210 according to techniques described in this disclosure. The map interface 212 of FIG. 3-3 can be the map interface 212 of FIG. 2 and FIG. 3-1.

In the environment 312, the vehicle 102 is traveling on a road with three lanes: the current lane 306, the left adjacent lane 308, and the right adjacent lane 310. The vehicle is traveling in the current lane 306.

The map interface 212 or the road model builder 104 can use a vehicle coordinate system (VCS) to describe relative points of measurement. The vehicle 102 can be assigned a VCS origin 314, which represents the (0,0) point in the VCS. For example, the center of the front bumper of the vehicle 102 can be defined as the VCS origin 314. In other implementations, the VCS origin 314 can be located at another position on the vehicle 102.

The VCS can include an x-axis 316 and y-axis 318. The x-axis 316 extends in a longitudinal direction in front of and behind the vehicle 102. A positive x value can indicate a position in front of the vehicle 102. The y-axis 318 extends in a lateral direction to the left and right of the vehicle 102. A positive y value can indicate a position to the left of the vehicle 102. The map interface 212 or the road model builder 104 can transform the centerline points 108 into the VCS so that the location of the centerline points 108 is relative to the VCS origin 314.

The road model builder 104 can use the position of the vehicle 102 (e.g., from location sensors) to efficiently localize the vehicle 102 to the road model 302. In particular, the road model builder 104 can determine a left-adjacent-lane offset 320, which represents the lateral distance or offset between the lane line 106 of the left adjacent lane 308 on the y-axis 318 and the VCS origin 314. A positive value for the left-adjacent-lane offset 320 indicates that the lane line 106 of the left adjacent lane 308 is to the left of the vehicle 102. The left-adjacent-lane offset 320 can be represented as a coefficient (e.g., a0) of a polynomial representing a segment of the centerline points 108 for the left adjacent lane 308. The left-adjacent-lane offset 320 can be used as one of the control inputs for a lane-changing feature.

The road model builder 104 can also determine a right-adjacent-lane offset 322, which represents the lateral distance or offset between the lane line 106 of the right adjacent lane 310 on the y-axis 318 and the VCS origin 314. A negative value for the right-adjacent-lane offset 322 indicates that the lane line 106 of right adjacent lane 310 is to the right of the vehicle 102. The right-adjacent-lane offset 322 can also be represented as a coefficient (e.g., a0) of a polynomial representing a segment of the centerline points 108 for the right adjacent lane 310. The right-adjacent-lane offset 322 can also be used as one of the control inputs for a lane-changing feature.

The road model builder 104 can determine a current-lane offset 324, which represents the lateral distance or offset between the lane line 106 of the current lane 306 on the y-axis 318 and the VCS origin 314. A negative value for the current-lane offset 324 indicates that the lane line 106 of current lane 306 is to the right of the vehicle 102. Similarly, a positive value for the current-lane offset 324 indicates that the lane line 106 of the current lane 306 is to the left of the vehicle 102. The current-lane offset 324 can also be represented as a coefficient (e.g., a0) of a polynomial representing a segment of the centerline points 108 for the current lane 306. The current-lane offset 324 can also be used as one of the control inputs for a lane-centering feature.

The road model builder 104 can determine a current-lane-longitudinal offset 326 that represents the distance traveled by the vehicle 102 along the x-axis 316 within the current lane segment 110-5. The current-lane-longitudinal offset 326 can be determined by summing the Euclidian distance between the centerline points 108 from the first centerline point 108 on the current lane segment 110-5 to the interpolated point where the y-axis 318 of the VCS intercepts the lane line 106.

The road model builder 104 can be designed to only use six centerline points 108 (or some other number) per execution cycle to optimize performance. The six centerline points 108 include the nearest centerline points 108 in the current lane segment 110-5 in both the positive and negative x-axis directions and the nearest centerline points 108 in the left-adjacent lane segment (e.g., lane segment 110-6) and the right-adjacent lane segment (e.g., lane segment 110-4) in both the positive and negative x-axis directions from where the y-axis 318 intercepts the respective lane lines 106. The road model builder 104 can determine the current-lane-longitudinal offset 326 by using the x-axis 316 zero intercept to interpolate between the two centerline points 108 in the current lane segment 110-5. Similarly, the road model builder 104 can determine the current-lane offset 324 by determining the distance between the VCS origin 314 and the point where the y-axis 318 intercepts the lane line 106 for the current lane segment 110-5.

The left-adjacent-lane offset 320, right-adjacent-lane offset 322, current-lane offset 324, and current-lane-longitudinal offset 326 can be represented in various units (e.g., meters).

Example Localization and Crawler Processes

Figures 1, 4:
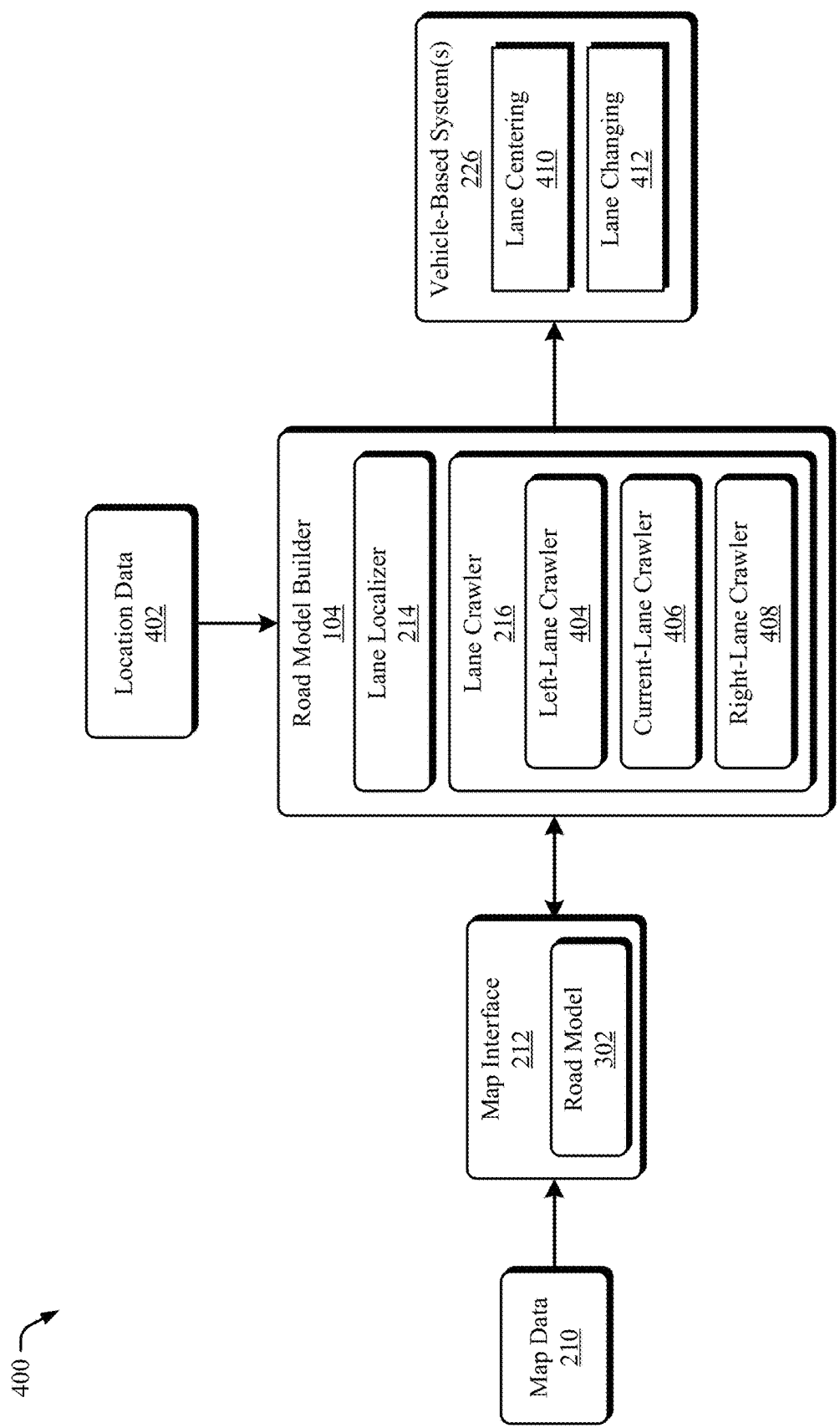
Figures 2, 4:
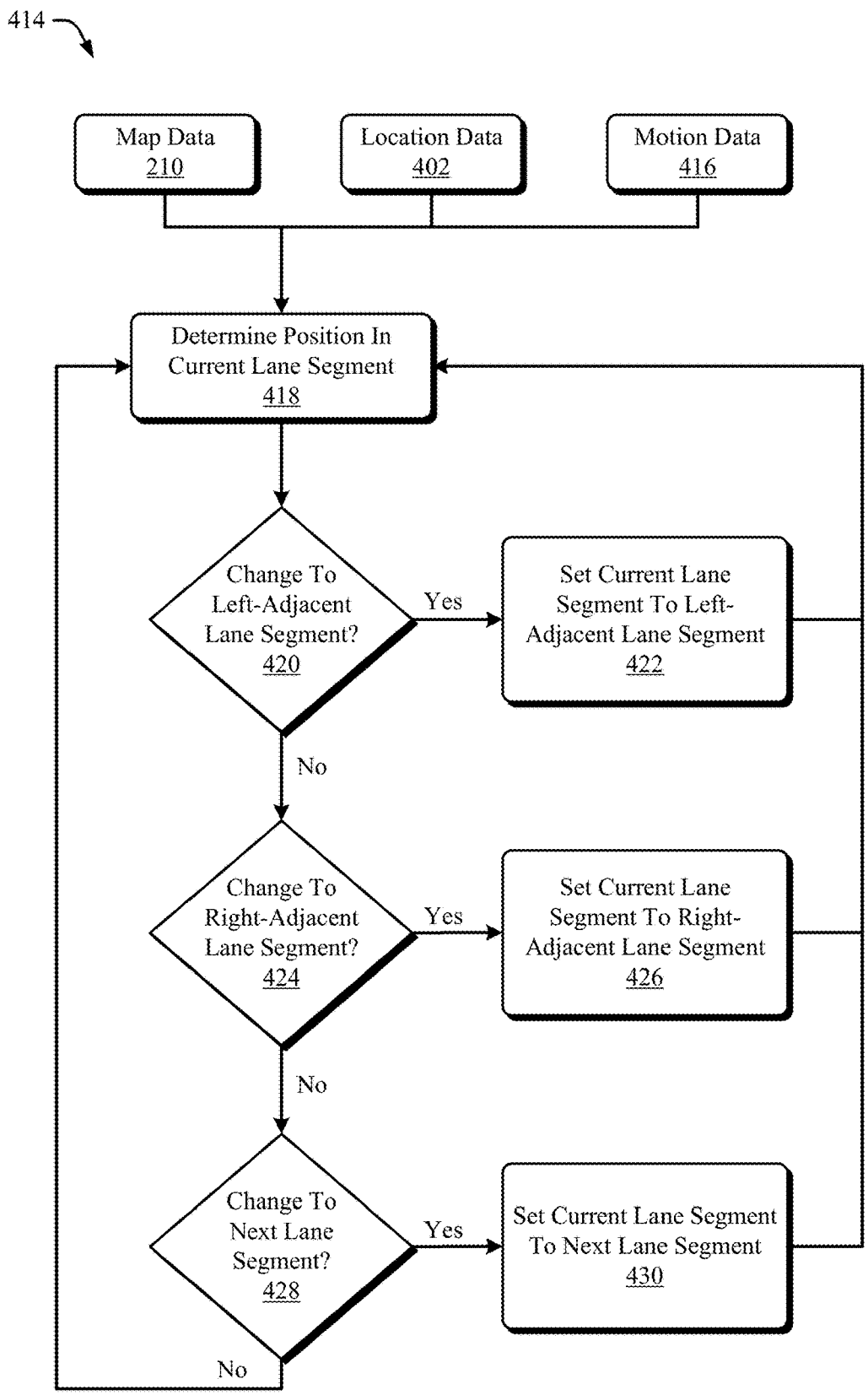

FIG. 4-1 illustrates an example flowchart 400 of a road model builder 104 to localize the vehicle 102 to map data 210 according to techniques described in this disclosure. The road model builder of FIG. 4 can be the road model builder 104 of FIGS. 1 and 2.

As described with respect to FIGS. 3-1 and 3-2, the map interface 212 uses the map data 210 to generate the road model 302. The road model builder 104 can query the map interface 212 for road geometry data in the road model 302. In particular, the lane localizer 214 uses the road model 302 and location data 402 to localize the vehicle 102 and determine a current lane segment 110 (e.g., the lane segment 110-5) in which the vehicle 102 is located. The location data 402 can include position data (e.g., latitude and longitude values) from a GPS and/or GNSS sensor in the vehicle 102. Based on the location data 402, the lane localizer 214 can query the portion of the road model 302 required to localize the vehicle 102 to the map data 210. In this way, the road model builder 104 or the lane localizer 214 minimizes the amount of road geometry data from the road model 302 that is cached and reduces overhead in the processing and transmission of road geometry data.

As described in greater detail with respect to FIG. 4-2, the lane crawler 216 uses the location data 402 and the road geometry data included in the road model 302 to crawl the lanes of the road. In particular, the lane crawler 216 includes a left-lane crawler 404, a current-lane crawler 406, and a right-lane crawler 408. The left-lane crawler 404 determines whether the vehicle 102 is located within the left adjacent lane 308. The current-lane crawler 406 determines whether the vehicle 102 is still within the current lane 306 and/or whether it is located in the next lane segment (e.g., the lane segment 110-8). The right-lane crawler 408 determines whether the vehicle 102 is located within the right adjacent lane 310.

The road model builder 104 can then provide data from the lane localizer 214 and the lane crawler 216 to the vehicle-based systems 226. For example, the vehicle-based systems 226 can use the vehicle position relative to the road model 302 to perform lane centering operations 410 and/or lane changing operations 412. For example, the lane localizer 214 can indicate that the vehicle 102 is laterally offset from the lane line 106 of the current lane 306 by a specified distance. The vehicle-based systems 226 can perform the lane centering operation 410 to move the vehicle to be centered on the lane line 106 for the current lane 306 or the current lane segment 110 (e.g., the lane segment 110-5). The lane crawler 216 can indicate to the vehicle-based systems 226 that the vehicle 102 is closer to an adjacent lane than the current lane 306. In response, the vehicle-based systems 226 can perform the lane changing operation 412 to move the vehicle 102 to the left adjacent lane 308 or the right adjacent lane 310, as appropriate.

FIG. 4-2 illustrates an example flowchart 414 of the road model builder 104 to localize the vehicle 102 to map data 210 according to techniques described in this disclosure. The flowchart 414 illustrates example operations of the lane localizer 214 and the lane crawler 216 of FIGS. 2 and 4-1.

At 418, the lane localizer 214 determines a position of the vehicle 102 based on the map data 210, the location data 402, or motion data 416 (e.g., from an accelerometer or IMU sensor). The lane localizer 214 can also use vision data (e.g., from a camera or other vision sensor) to determine a position of the vehicle 102. The location data 402 can include latitude and longitude position data for the vehicle 102. The motion data 416 can be used to estimate the position of the vehicle 102 from a previously determined position based on dead reckoning estimates. The lane localizer 214 uses the position of the vehicle 102 to identify the lane segment 110 in which the vehicle 102 is located. The lane localizer 214 can also continually determine the relative position (e.g., the current-lane-longitudinal offset 326) of the vehicle 102 within the current lane segment 110.

At 420, the lane crawler 216 determines whether to change the current lane segment 110 (e.g., the lane segment 110-5) to the left-adjacent lane segment (e.g., the lane segment 110-6). The lane localizer 214 or the lane crawler 216 determines the distance along the y-axis 318 of the vehicle 102 to the lane line 106 of the current lane segment 110 and the lane line 106 of the left adjacent lane 308. In particular, the lane localizer 214 or the lane crawler 216 determines the left-adjacent-lane offset 320 and the current-lane offset 324.

At 422, if the distance to the lane line 106 of the left adjacent lane 308 (e.g., the left-adjacent-lane offset 320) is smaller than the distance to the lane line 106 of the current lane 306 (e.g., the current-lane offset 324), the lane crawler 216 determines that a transition has occurred to the left adjacent lane 308. The lane crawler 216 then sets the current lane segment 110 (e.g., the lane segment 110-5) to the left-adjacent lane segment 110 (e.g., the lane segment 110-6). If the distance to the lane line 106 of the left adjacent lane 308 (e.g., left-adjacent-lane offset 320) is not smaller than the distance to the lane line 106 of the current lane 306 (e.g., the current-lane offset 324), the lane crawler 216 proceeds to step 424.

At 424, the lane crawler 216 determines whether to change the current lane segment 110 (e.g., the lane segment 110-5) to the right-adjacent lane segment (e.g., the lane segment 110-4). The lane localizer 214 or the lane crawler 216 determines the distance along the y-axis 318 of the vehicle 102 to the lane line 106 of the current lane segment 110 and the lane line 106 of the right adjacent lane 310. In particular, the lane localizer 214 or the lane crawler 216 determines the right-adjacent-lane offset 322 and the current-lane offset 324.

At 426, if the distance to the lane line 106 of the right adjacent lane 310 (e.g., the right-adjacent-lane offset 322) is smaller than the distance to the lane line 106 of the current lane 306 (e.g., the current-lane offset 324), the lane crawler 216 determines that a transition has occurred to the right adjacent lane 310. The lane crawler 216 then sets the current lane segment 110 to the right adjacent lane segment (e.g., the lane segment 110-4). If the distance to the lane line 106 of the right adjacent lane 310 (e.g., the right-adjacent-lane offset 322) is not smaller than the distance to the lane line 106 of the current lane 306 (e.g., the current-lane offset 324), the lane crawler 216 proceeds to step 428.

At 428, the lane crawler 216 determines whether to change the current lane segment 110 (e.g., the lane segment 110-5) to the next lane segment 110 (e.g., the lane segment 110-8). The lane localizer 214 or the lane crawler 216 determines the distance along the x-axis 316 of the vehicle 102 from the first centerline point 108 of the current lane segment 110 (e.g., the lane segment 110-5) to the VCS origin 314. In particular, the lane localizer 214 or the lane crawler 216 determines the current-lane-longitudinal offset 326.

At 430, if the distance to the VCS origin 314 from the first centerline point 108 (e.g., the current-lane-longitudinal offset 326) is longitudinally beyond the last centerline point 108 of the current lane segment 110 (e.g., the lane segment 110-5), the lane crawler 216 determines that a transition to the next lane segment 110 (e.g., the lane segment 110-8) has occurred. In particular, the lane crawler 216 sets the current lane segment 110 to the next lane segment 110 (e.g., the lane segment 110-8). If the current lane 306 splits at the next lane segment group 112 (e.g., the lane segment group 112-3), the lane crawler 216 can use additional logic to determine to which lane segment 110 to transition the vehicle 102 and the road model 302. If the distance to the VCS origin 314 from the first centerline point 108 (e.g., the current-lane-longitudinal offset 326) is not longitudinally beyond the last centerline point 108 of the current lane segment 110, the lane localizer 214 and the lane crawler 216 return to step 418.

Figure 5:
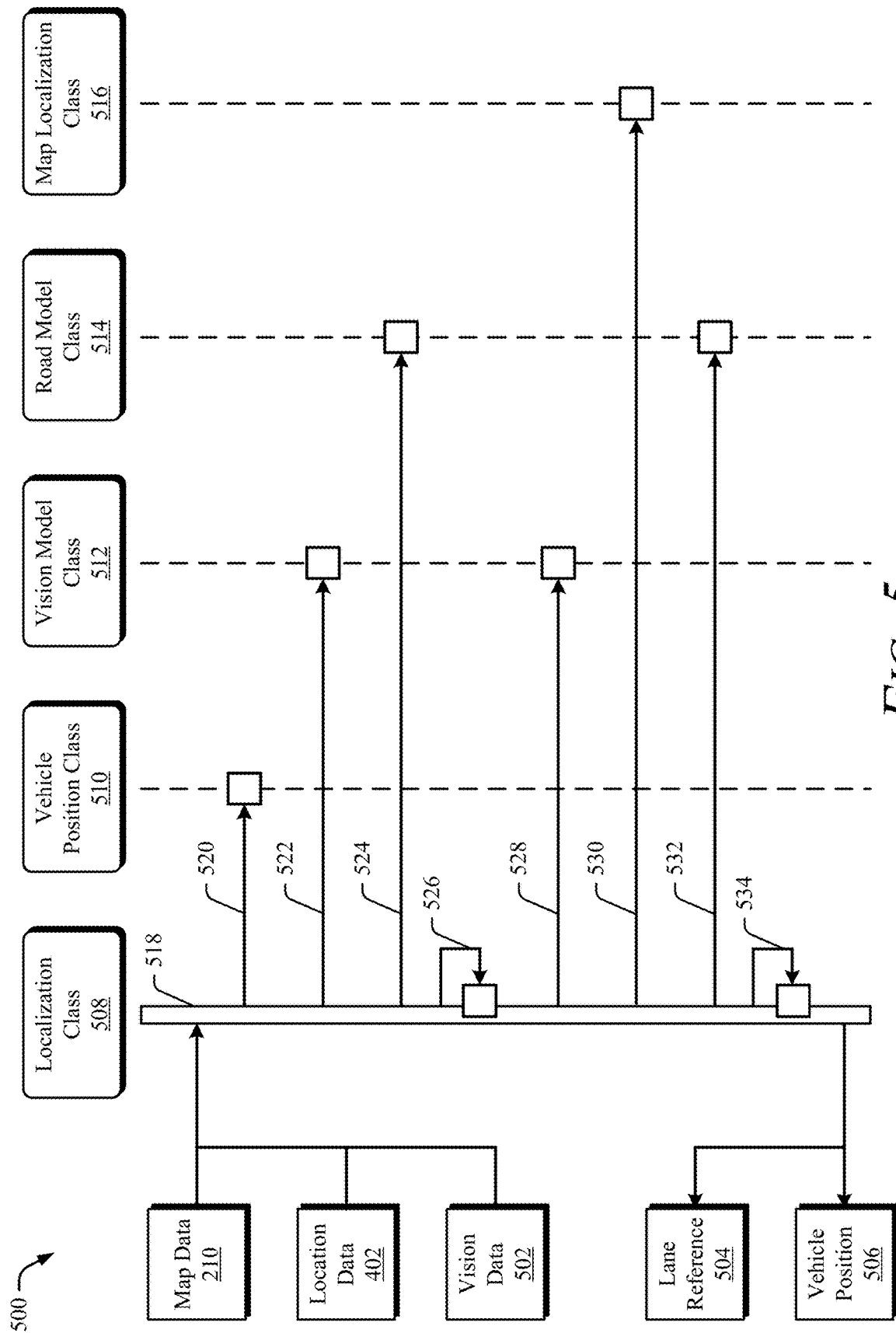
FIG. 5 illustrates an example localization flowchart of a software method to localize a vehicle to map data that can be implemented according to techniques in this disclosure.

FIG. 5 illustrates an example localization flowchart 500 of a software method to localize a vehicle to map data that can be implemented according to techniques in this disclosure. The localization flowchart 500 can be implemented by the lane localizer 214 or the road model builder 104.

The localization flowchart 500 inputs the map data 210, the location data 402, and vision data 502 to a localization class 508. The vision data 502 can be data from a front-facing camera on the vehicle 102. The localization class 508 can be the entry point for the flowchart 500 to localize the vehicle 102 to the map data 210. The processor 204 can continuously execute the localization flowchart 500 (e.g., at a frequency of 50 Hz) and output a lane reference 504 and a vehicle position 506 for the vehicle 102. The lane reference 504 and the vehicle position 506 can be output to the lane crawler 216 and/or the vehicle-based systems 226 (e.g., to perform the lane centering operation 410 or the lane changing operation 412).

The localization flowchart 500 also includes a vehicle position class 510, vision model class 512, road model class 514, and map localization class 516. The vehicle position class 510 can validate the location data 402 and convert heading data from radians to degrees. The vision model class 512 can validate the vision data 502 and output the lane line 106 for the current lane 306 in the vehicle coordinate system. The vision model class 512 can also perform additional filtering and processing (e.g., candidate selection logic) to determine the lane line 106 for the left adjacent lane 308 and the right adjacent lane 310. The vision model class 512 can also smooth the path of the lane line 106 for the current lane 306 during lane splits and mergers where the lane line 106 for the left adjacent lane 308 or the right adjacent lane 310 become invalid due to gaps in the paint markers or lines on the road.

The road model class 514 includes the hierarchical data structure for road lane geometry data in the map data 210 or the road model 302. The road model class 514 can cache data for one or more lane segment groups 112 to make the localization flowchart 500 more efficient. The road model class 514 can also provide multiple methods to process the map data 210 or the road model 302 to allow abstraction from other software components. The map localization class 516 can control the execution of the localization flowchart 500 to ensure completion of the localization process during each execution cycle of the localization flowchart 500.

At 518, the processor 204 starts the localization flowchart 500. The localization flowchart 500 can use a scheduler thread to periodically call (e.g., at a frequency of 50 Hz) the localization class 508.

At 520, the localization class 508 calls the vehicle position class 510 to update the location data 402. The location data 402 is generally processed in each cycle of the localization flowchart 500. The location data 402 generally includes latitude, longitude, and heading data related to the location of the vehicle 102.

At 522, the localization class 508 calls the vision model class 512 to update the vision data 502. The vision data 502 can include polynomial coefficients for the lane lines 106 of the current lane 306, the left adjacent lane 308, and the right adjacent lane 310. The polynomial coefficients can include the following coefficients to fit the lane lines 106 with an equation: a first coefficient (e.g., a0) that represents a lateral offset from the VCS origin 314, a second coefficient (e.g., a1) that represents a heading coefficient, and a third coefficient (e.g., a2) that represents a curvature coefficient.

The vision data 502 can be updated at a slower frequency (e.g., at a frequency between 20 Hz and 30 Hz) than the execution frequency of the localization flowchart 500; in this way, the localization class 508 can call the vision model class 512 only when updated vision data 502 is available. When the localization class 508 calls the vision model class 512, the vision model class 512 can also execute validation logic to ensure the polynomial coefficients (e.g., a0, a1, and a2) are within a valid range to be used in the localization flowchart 500.

At 524, the localization class 508 calls the road model class 514 to obtain new road geometry data. For example, the localization class 508 can periodically call the road model class 514 (e.g., at a frequency of 1 Hz) to obtain new data from the road model 302. The road model class 514 can provide data related to each lane segment group 112 (e.g., the current lane segment group 112-2 and the next lane segment group 112-3) that is required in the respective cycle of the localization flowchart 500.

At 526, the localization class 508 executes logic to check the input data (e.g., the map data 210, the location data 402, and the vision data 502) for delays or freezes in obtaining data updates. In this way, the localization class 508 can perform a watchdog pattern to monitor for a continuous flow of data into the localization flowchart 500.

At 528, the localization class 508 calls the vision model class 512 to execute filter processes to smooth the vision data 502. For example, the first coefficient (e.g., a0) can have a high-frequency oscillation as the vision model class 512 matches between the inside and outside edges of the paint markers on the road. The vision model class 512 can also use additional logic to determine when the polynomial coefficients of the lane line 106 for the left adjacent lane 308 or the right adjacent lane 310 become invalid and switch to using the polynomial coefficient for the opposite lane line. In this way, the localization flowchart 500 can improve the localization process for lane merging and splitting scenarios.

Figure 6:
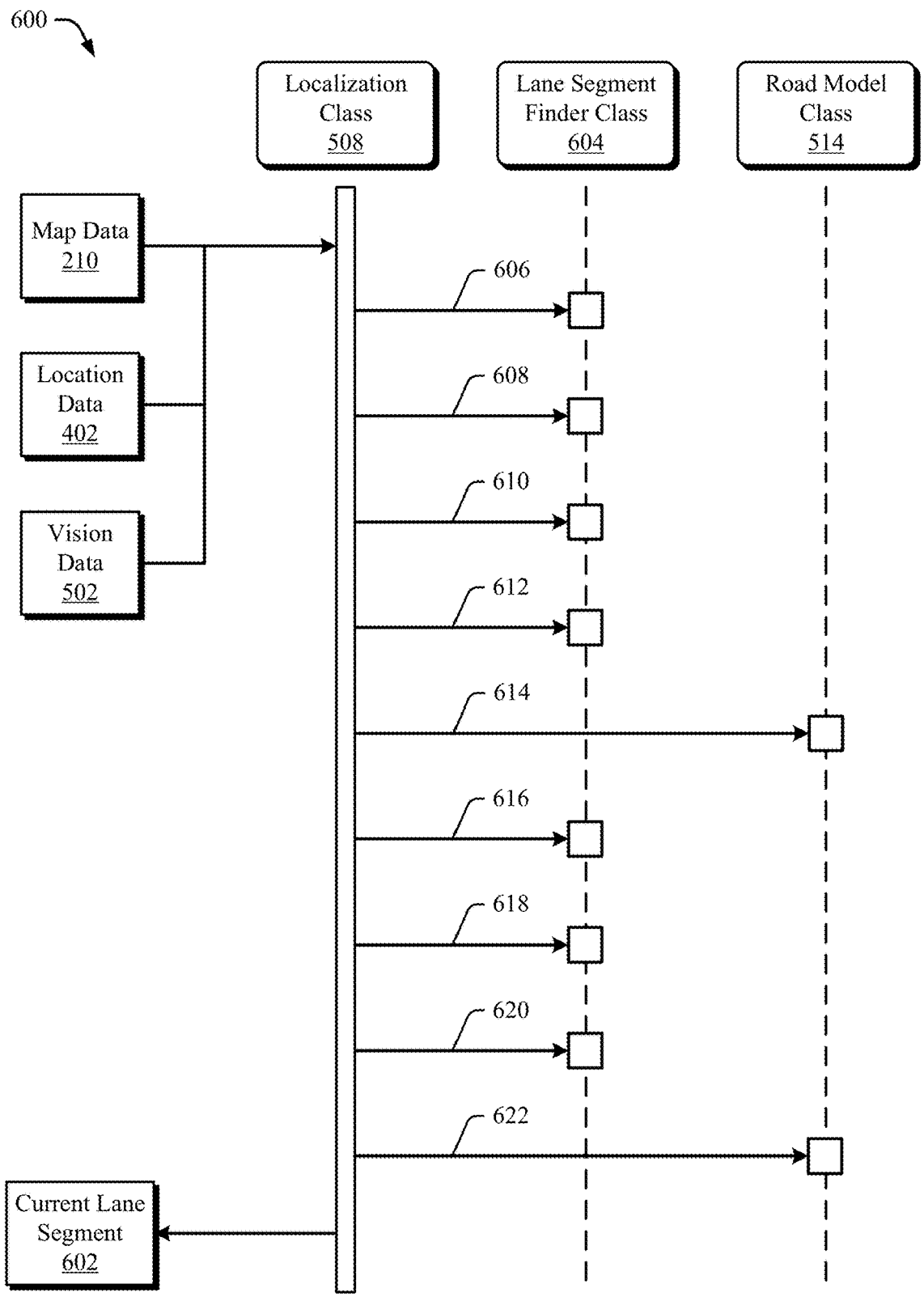
FIG. 6 illustrates an example crawler flowchart of a software method to crawl lanes that can be implemented according to techniques in this disclosure.

At 530, the localization class 508 calls the map localization class 516 to execute a lane crawler method (e.g., the flowchart 414 of FIG. 4-2 or the crawler flowchart 600 of FIG. 6). The lane crawler method outputs the current lane segment 110 (e.g., the lane segment 110-5) and the relative position for the vehicle 102 within the current lane segment 110.

At 532, the localization class 508 calls the road model class 514 to determine a distance traveled by the vehicle 102 relative to the road model 302.

At 534, the localization class 508 builds the final output of the localization flowchart 500: the lane reference 504 and the vehicle position 506. The localization class 508 can also determine if the localization flowchart 500 was able to successfully localize the vehicle 102 to the map data 210 and/or the road model 302.

FIG. 6 illustrates an example crawler flowchart 600 of a software method to crawl lanes that can be implemented according to techniques in this disclosure. The crawler flowchart 600 can be implemented by the lane crawler 216 or the road model builder 104.

The processor 204 can periodically execute the crawler flowchart 600 to determine a current lane segment 602 (e.g., the lane segment 110-5) for the vehicle 102. For example, the road model builder 104 or the lane crawler 216 may not have a current lane segment 110 or current lane segment group 112 after the localization process is reset or during its initialization. The crawler flowchart 600 includes the localization class 508, a lane segment finder class 604, and the road model class 514. The lane segment finder class 604 can set a new lane segment 110 as the current lane segment 602 and retrieve road geometry data from the road model 302.

At 606, the crawler flowchart 600 receives as inputs the map data 210, the location data 402, and the vision data 502 to the localization class 508. Specifically, the location data 402 can include the estimated position of the vehicle 102 and the vehicle position 506. The localization class 508 calls the lane segment finder class 604 to obtain a set of lane segment groups 112 near the estimated position of the vehicle 102 or the vehicle position 506.

At 608, the localization class 508 calls the lane segment finder class 604 to determine the lane line 106 relative to the vehicle 102 for the current lane segment 110 (e.g., the lane segment 110-5).

At 610, the localization class 508 calls the lane segment finder class 604 to determine the lane line 106 for the left adjacent lane 308 or the left-adjacent lane segment 110 (e.g., the lane segment 110-6), if one exists, relative to the vehicle 102.

At 612, the localization class 508 calls the lane segment finder class 604 to determine the lane line 106 for the right adjacent lane 310 or the right-adjacent lane segment 110 (e.g., the lane segment 110-4), if one exists, relative to the vehicle 102.

At 614, the localization class 508 calls the road model class 514 to reset the crawler flowchart 600 and reinitialize the localization process (e.g., the localization flowchart 500) if the processor 204 is not able to determine a relative position for the vehicle 102 in the current lane 306 or the current lane segment 110 (e.g., the lane segment 110-5).

At 616, the localization class 508 calls the lane segment finder class 606 to transition the vehicle 102 to the left adjacent lane 308 or the left-adjacent lane segment 110 (e.g., the lane segment 110-6). The transition to the left adjacent lane 308 or the left-adjacent lane segment 110 (e.g., the lane segment 110-6) is responsive to determining that the left-adjacent-lane offset 320 is smaller than the current-lane offset 324.

At 618, the localization class 508 calls the lane segment finder class 606 to transition the vehicle 102 to the right adjacent lane 310 or the right-adjacent lane segment 110 (e.g., the lane segment 110-4). The transition to the right adjacent lane 310 or the right-adjacent lane segment 110 (e.g., the lane segment 110-4) is responsive to determining that right-adjacent-lane offset 322 is smaller than the current-lane offset 324.

At 620, the localization class 508 calls the lane segment finder class 606 to transition the vehicle 102 to the next lane segment 110 (e.g., the lane segment 110-8). The transition to the next lane segment 110 (e.g., the lane segment 110-8) is responsive to determining that the current-lane-longitudinal offset 326 is beyond the last centerline point 108 for the current lane segment 110.

At 622, the localization class 508 calls the road model class 514 to reset the crawler flowchart 600 and reinitialize the localization process (e.g., the localization flowchart 500) if the processor 204 is not able to transition to any of the adjacent lane segments 110 (e.g., the left-adjacent lane segment, the right-adjacent lane segment, or the next lane segment fails) (e.g., running out of road on a highway exit).

Figures 1, 7:
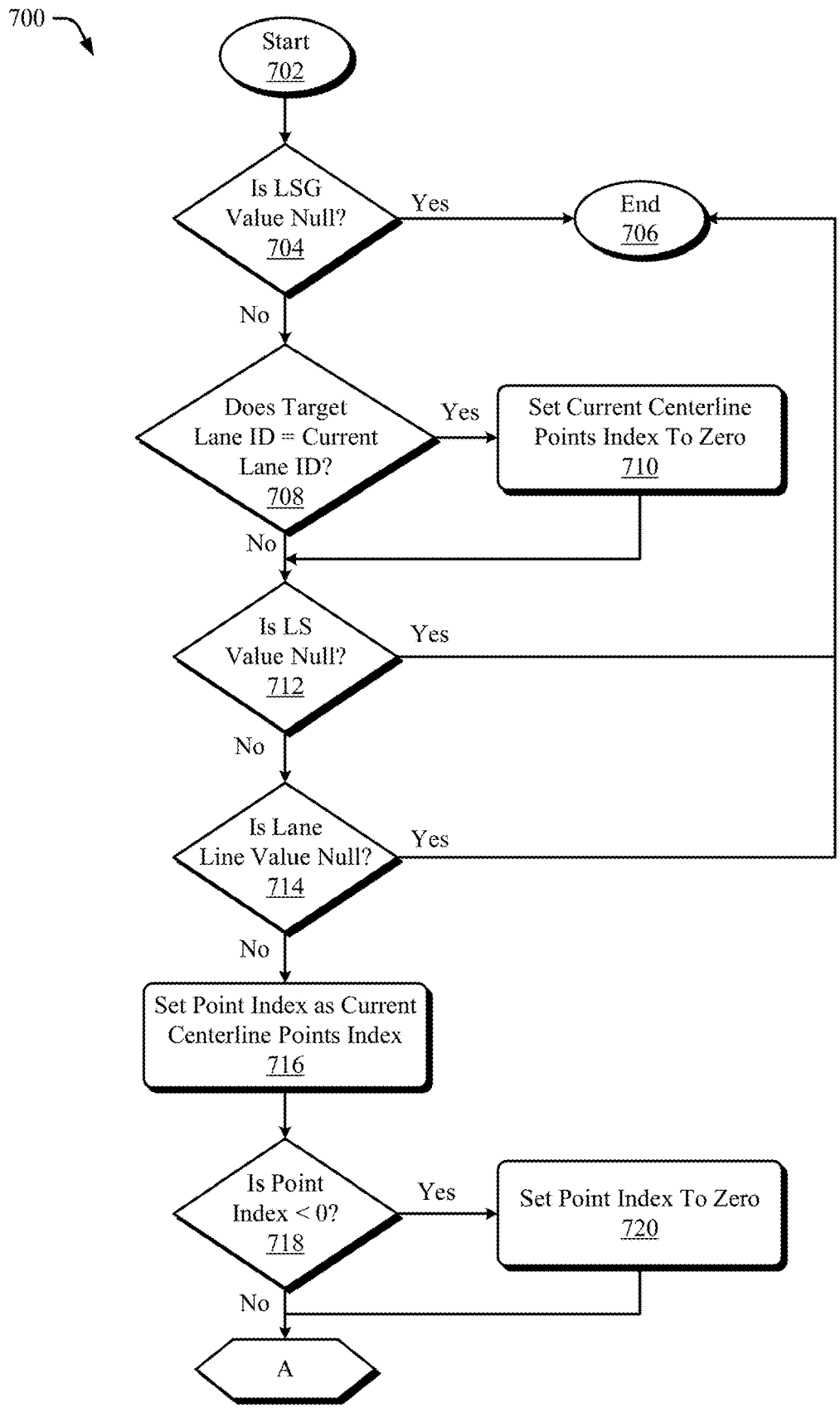
Figures 2, 7:
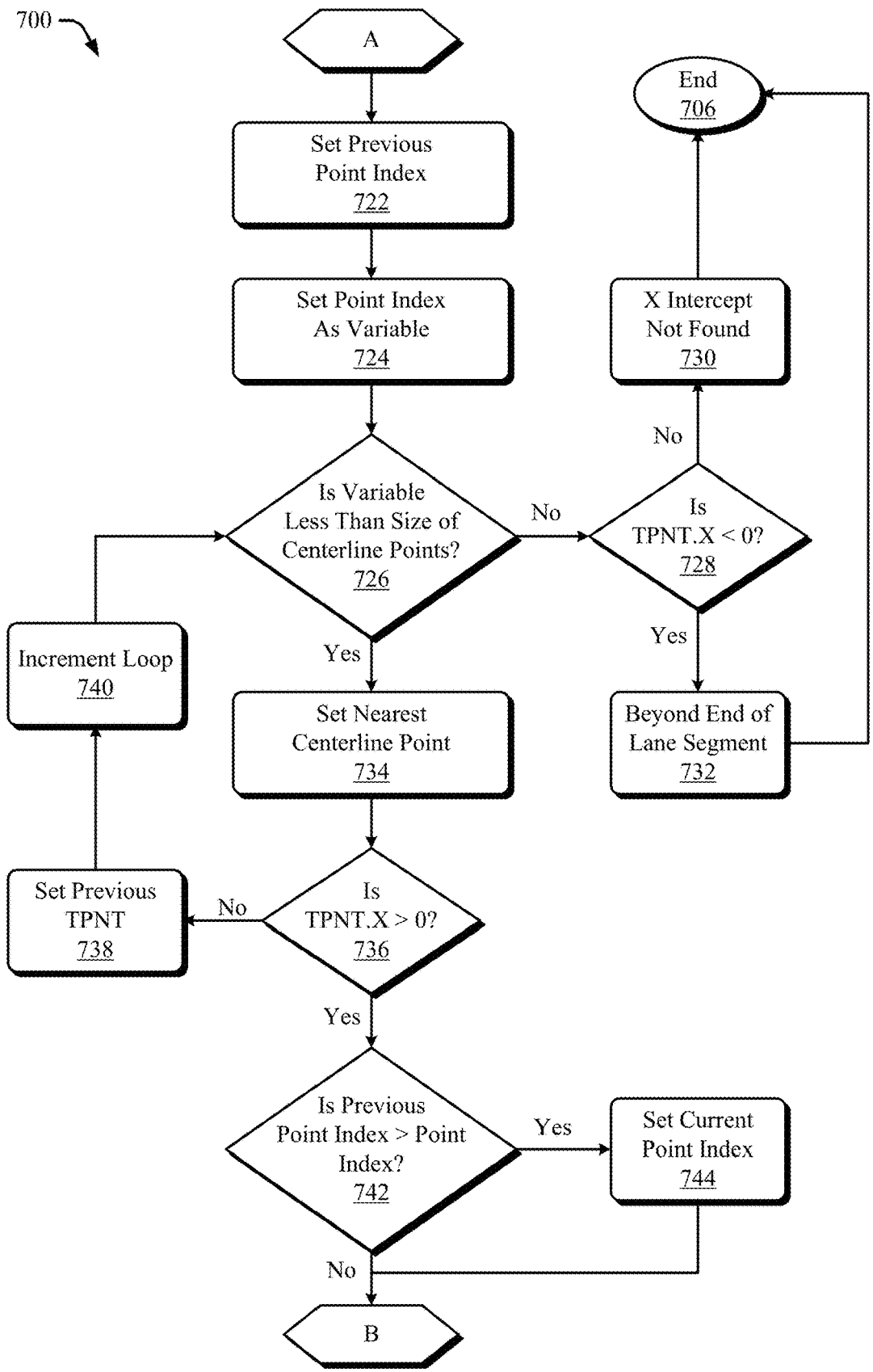
Figures 3, 7:
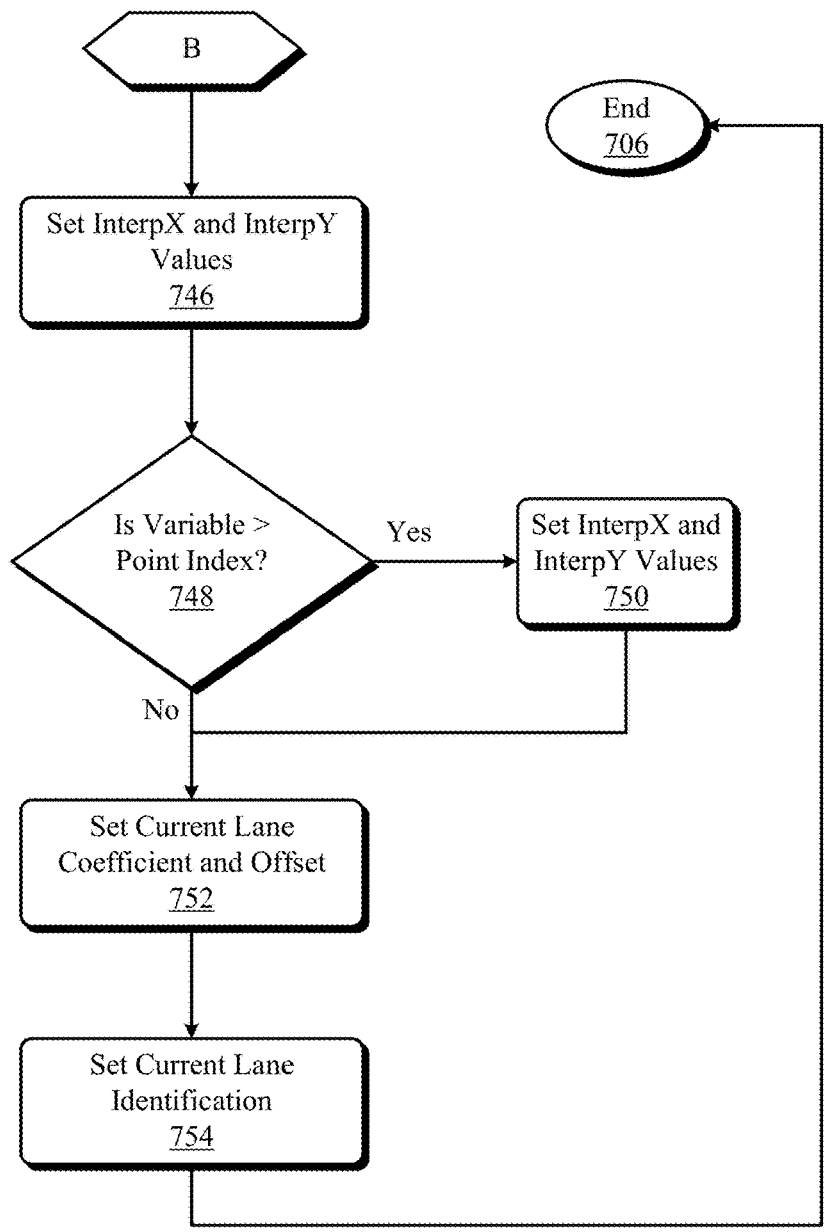

FIGS. 7-1 through 7-3 illustrate an example crawler flowchart 700 to crawl lanes that can be implemented according to techniques in this disclosure. The processor 204 can periodically execute the crawler flowchart 700 to determine a current lane segment 602 for the vehicle 102. For example, the road model builder 104 may not have a current lane segment 110 or current lane segment group 112 after the localization process is reset or during its initialization.

At 702, the processor 204 starts the crawler flowchart 700 knowing the current lane segment group 112 in which the vehicle 102 is located. The crawler flowchart 700 cannot start if the current lane segment group has not been determined.

At 704, the processor 204 determines whether the current lane segment group value is null. At 706, if the current lane segment group value is null or not available, then the processor 204 ends the crawler flowchart 700.

At 708, if the current lane segment group value is not null or is available, then the processor 204 determines whether a target lane identification (Target Lane ID) is equal to a current lane identification (Current Lane ID). The target lane identification represents a value from a state variable of the road model 302 identifying the target lane. The current lane identification represents an internal variable used to detect changes in the current lane in which the vehicle 102 is traveling.

At 710, if the target lane identification is equal to the current lane identification, the processor 204 sets the current centerline points index to zero. The current centerline points index is a variable used as a state variable to track the index in the centerline point array index to the nearest centerline point behind the position of the vehicle 102. In this way, the crawler flowchart 700 resets the current centerline points index when a lane change occurs.

At 712, after setting the current centerline points index to zero or if the target lane identification is not equal to the current lane identification, the processor 204 determines whether the lane segment value is null. The lane segment value is a reference to the current lane segment object for the current lane in the road patch data. If the lane segment value is null or not available, then the processor 204 ends the crawler flowchart 700 (e.g., at operation 706). The crawler flowchart 700 will not execute if the lane segment 110 is not available.

At 714, if the lane segment value is not null or is available, the processor 204 determines whether the lane line value is null. The lane line value is a variable that references the lane line 106 containing the array of centerline points 108. If the lane line value is null or not available, then the processor 204 ends the crawler flowchart 700 (e.g., at operation 706). The crawler flowchart 700 will not execute if the lane line 106 or an array of centerline points 108 is not available for the current lane segment 602.

At 716, if the lane line value is not null or is available, the processor 204 sets the point index equal to the current centerline points index value. The previous point index value is a variable used to index into the centerline point array for the nearest point behind the vehicle 102. In this way, the crawler flowchart 700 initializes the point indexes for the nearest map point forward and behind the vehicle 102 based on where the vehicle 102 intercepts the x offset.

At 718, the processor 204 determines whether the point index is less than zero.

At 720, if the point index is less than zero, then the processor 204 sets the point index to zero.

At 722, if the point index is not less than zero or after setting the point index to zero, the processor 204 sets the previous point index. The previous point index is a variable used to index into the centerline point array for the nearest point behind the vehicle 102.

At 724, the processor 204 sets the point index as a loop variable.

At 726, the processor 204 determines whether the loop variable is less than the size of the centerline points index.

At 728, if the loop variable is not less than the size of the centerline points index, the processor 204 determines whether the x-value of a transformed centerline point (TPNT.X) is less than zero. The transformed centerline point is a variable to store the centerline point transformed to the vehicle coordinate system for the nearest point ahead of the vehicle 102.

At 730, if the x-value of the transformed centerline point is not less than zero, then the processor 204 determines that an x-intercept is not found and ends the crawler flowchart 700.

At 732, if the x-value of the transformed centerline point is less than zero, the processor 204 determines that the transformed centerline point extends beyond the end of the current lane segment and ends the crawler flowchart 700.

At 734, if the loop variable is less than the size of the centerline points index, the processor 204 sets the nearest centerline point.

At 736, the processor 204 determines whether the x-value of the transformed centerline point is greater than zero.

At 738, if the x-value of the transformed centerline point is not greater than zero, then the processor 204 sets the previous transformed centerline point. The previous transformed centerline point is a variable to store the map centerline point transformed to the vehicle coordinate system for the nearest point behind the vehicle 102. At 740, the processor 204 increments the loop variable value. In this way, the crawler flowchart 700, can execute a for-loop through the lane centerline points. The loop will execute two loops to maintain the state of the point index. The loop protects for a case where a position could jump multiple map points if points are too closely spaced.

At 742, if the x-value of the transformed centerline point is greater than zero, then the processor 204 determines whether the previous point index is greater than the point index.

At 744, if the previous point index is greater than the point index, the processor 204 sets the current point index.

At 746, if the previous point index is not greater than the point index or after setting the current point index, the processor 204 sets values for the interpolated longitudinal distance (InterpX) and the interpolated lateral distance (InterpY). The interpolated longitudinal distance represents the vehicle longitudinal distance from the centerline point behind the vehicle 102 to the vehicle position as interpolated between the two map points in the vehicle coordinate system. The interpolated lateral distance represents the vehicle lateral distance from the centerline point at the interpolated longitudinal distance in the vehicle coordinate system.

At 748, the processor 204 determines whether the loop variable is greater than the point index.

At 750, if the loop variable is greater than the point index, the processor 204 sets the interpolated longitudinal distance and the interpolated lateral distance.

At 752, if the loop variable is not greater than the point index or after setting the interpolated longitudinal distance and the interpolated lateral distance, the processor 204 sets the current lane lateral offset and longitudinal offset. The current lane lateral offset represents the lateral offset of the lane line relative to the vehicle in meters. The current lane longitudinal offset represents the longitudinal offset the vehicle 102 traveled along the current lane segment in meters.

At 754, the processor 204 sets the current lane identification and ends the crawler flowchart 700.

EXAMPLE METHOD

Figure 8:
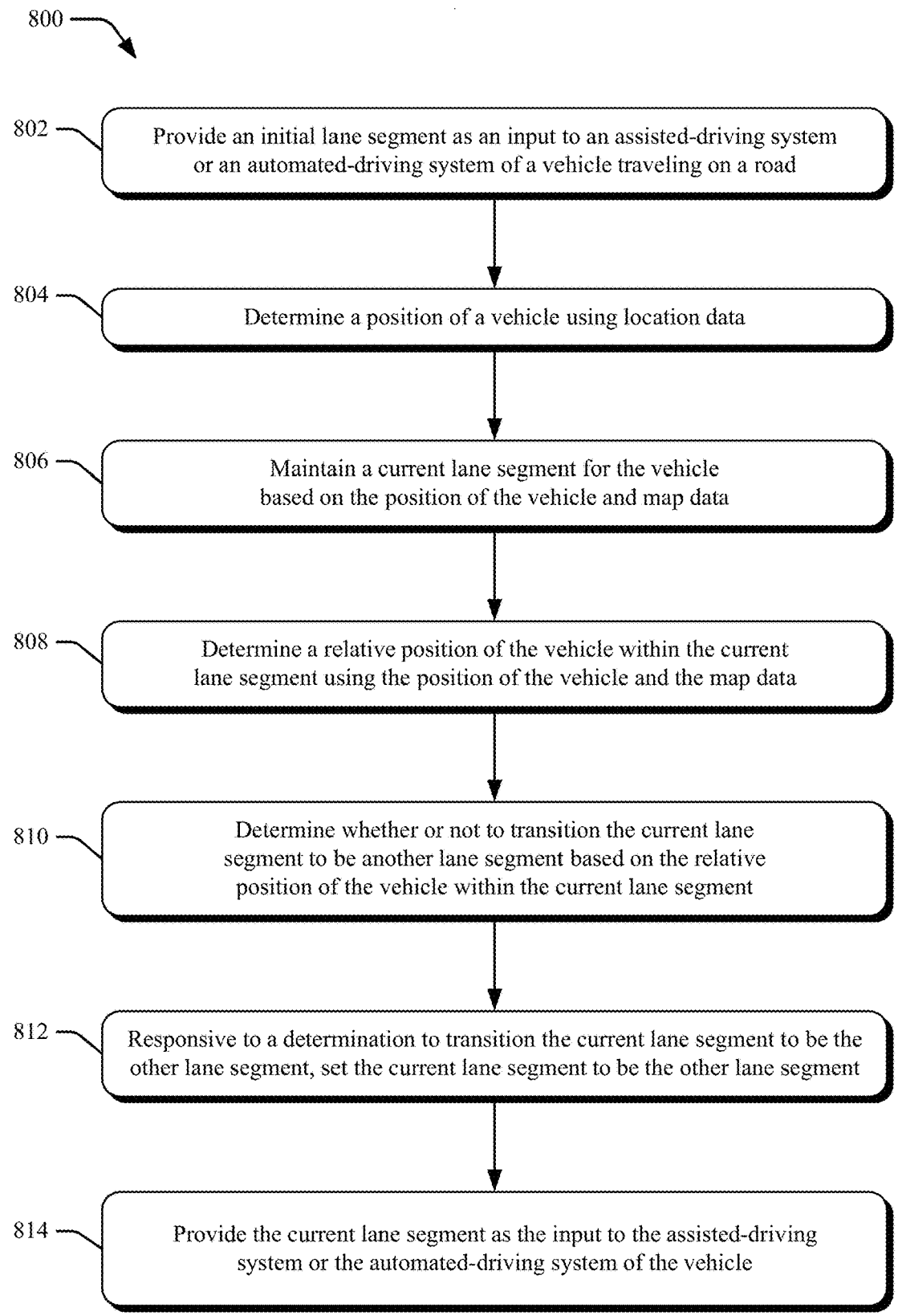
FIG. 8 illustrates an example method of a road model builder to localize a vehicle to map data.

FIG. 8 illustrates an example method 800 of a road model builder to localize a vehicle to map data. Method 800 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the road model builder 104 of FIGS. 1 through 7-3 and entities detailed therein, reference to which is made for example only. The techniques are not limited to performance by one entity or multiple entities.

At 802, an initial lane segment is provided as an input to an assisted-driving system or an automated-driving system at least partially in control of a vehicle traveling on a road. For example, the road model builder 104 or the processor 204 can provide an initial lane segment 110 (e.g., the lane segment 110-5) as an input as an input to the vehicle-based systems 226, which include an assisted-driving system or an automated-driving system of the vehicle 102. The assisted-driving system or the automated-driving system can include an automatic cruise control system, a traffic jam assist system, a lane-centering assist system, or an L3/L4 autonomous driving on highways system.

At 804, a position of a vehicle is determined using location data for the vehicle. For example, the road model builder 104 or the processor 204 can use the location data 402 to determine a position of the vehicle 102. The location data 402 can include latitude and longitude position data of the vehicle 102 from a GPS, GNSS, and/or IMU sensor. The road model builder 104 can use the vehicle's position to localize the vehicle 102 to the map data 210.

At 806, a current lane segment for the vehicle is maintained based on the position of the vehicle and map data. For example, the lane localizer 214 or the processor 204 can maintain or determine, based on the vehicle's position and the map data 210, a current lane segment 110 (e.g., the lane segment 110-5) for the vehicle 102.

As described above, the map interface 212 can generate the road model 302 for the roadway based on the map data 210. The road model 302 includes a series of lane lines 106, lane segments 110, and lane segment groups 112. The lane lines 106 represent lateral centers of respective lane segments 110 and can be determined using multiple centerline points 108 associated with the lateral center of respective lane segments 110. The lane segments 110 represent a portion of a lane of the road. The lane segment groups 112 represent one or more lane segments 110 for lanes of the road corresponding to traffic traveling in the same direction. The road model builder 104 or the processor 204 can provide the road model 302 as an additional input to the vehicle-based systems 226, which include an assisted-driving system or an automated-driving system of the vehicle 102.

The map interface 212 can obtain the map data 210 in a format associated with respective map providers. The map interface 212 can generate the road model 302 so that it can receive or obtain the map data 210 in at least one other format that is independent of or different than the format associated with another map provider. In this way, the road model 302 can be provided by the map interface 212 in a format independent of different providers of the map data 210. As a result, the road model builder 104 can use map data 210 from a variety of map providers and be agnostic to different data formats. In the case of changed or new road patterns, the road model builder 104 can limit the amount of updated map data 210 or road model 302 to only the changed portion of the road and omit any portions unchanged, reducing the transmission, processing, and memory resources required by the changed road patterns.

At 808, a relative position of the vehicle within the current lane segment is determined using the position of the vehicle and the map data. For example, the lane localizer 214 or the processor 204 can determine, using the position of the vehicle 102 and the map data 210, a relative position of the vehicle 102 within the current lane segment 110.

The road model builder 104 can define a vehicle coordinate system with the VCS origin 314, the x-axis 316, and the y-axis 318. Using the vehicle coordinate system, the lane localizer 214 can determine a current-lane offset 324, which represents the lateral distance or offset of the vehicle 102 (e.g., the VCS origin 314) to the lane line 106 (e.g., the lane line 106-1) of the current lane segment 110 (e.g., the lane segment 110-5). The current-lane offset 324 can be determined based on linear interpolation to the two nearest centerline points 108 of the lane line 106 of the current lane segment 110 as described in greater detail with respect to FIG. 3-3.

The lane localizer 214 can also determine the left-adjacent-lane offset 320 and the right-adjacent-lane offset 322. The left-adjacent-lane offset 320 represents the lateral distance or offset between the lane line 106 of the left adjacent lane 308 on the y-axis 318 and the vehicle 102 (e.g., the VCS origin 314). The right-adjacent-lane offset 322 represents the lateral distance or offset between the lane line 106 of the right adjacent lane 310 on the y-axis 318 and the vehicle 102 (e.g., the VCS origin 314). Similar to the current-lane offset 324, the lane localizer 214 can determine the left-adjacent-lane offset 320 and the right-adjacent-lane offset 322 based on linear interpolation to the two nearest centerline points for the lane line 106 of the respective lane segment 110.

In addition, the lane localizer 214 can determine a current-lane-longitudinal offset 326 that represents the distance traveled by the vehicle 102 along the x-axis 316 within or from the beginning of the current lane segment 110.

At 810, it is determined whether or not to transition the current lane segment to be another lane segment based on the relative position of the vehicle within the current lane segment. For example, the lane crawler 216 can determine, based on the relative position of the vehicle 102 within the current lane segment 110, whether or not to transition the current lane segment 110 to be another lane segment 110.

The lane crawler 216 can use the current-lane offset 324 to determine whether to transition the vehicle 102 to the left-adjacent lane segment 110 (e.g., the lane segment 110-6) or the right-adjacent lane segment 110 (e.g., the lane segment 110-4). The left-lane crawler 404 can transition the vehicle 102 to the left-adjacent lane segment 110 (e.g., the lane segment 110-6) responsive to determining that the current-lane offset 324 is larger than the left-adjacent-lane offset 320. Similarly, the right-lane crawler 408 can transition the vehicle 102 to the right-adjacent lane segment 110 (e.g., the lane segment 110-4) responsive to determining that the current-lane offset 324 is larger than the right-adjacent-lane offset 322.

The lane crawler 216 can use the current-lane-longitudinal offset 326 to determine whether to transition the vehicle 102 to the next lane segment 110 (e.g., the lane segment 110-8). The current-lane crawler 406 can transition the vehicle 102 to the next lane segment 110 responsive to determining that the current-lane-longitudinal offset 326 is longer than the position of the last centerline point 108 for the current lane segment 110.

At 812, the current lane segment is set to be the other lane segment responsive to a determination to transition the current lane segment to be the other lane segment. For example, the lane crawler 216 can set the current lane segment 110 to be the lane segment to which it was determined to transition the vehicle 102. If the left-lane crawler 404, for example, determined that a transition to the left-adjacent-lane segment 110 (e.g., the lane segment 110-6) occurred, the lane crawler 216 localizes the vehicle 102 to the lane segment 110-6.

At 814, the current lane segment is provided as the input to the assisted-driving system or the automated-driving system of the vehicle. For example, the road model builder 104 or the processor 204 can provide the current lane segment 110 as the input to the vehicle-based systems 226, which include the assisted-driving system or the automated-driving system of the vehicle 102. The assisted-driving system or the automated-driving system can include an automatic cruise control system, a traffic-jam assist system, a lane-centering assist system, or an L3/L4 autonomous driving on highways system.

ADDITIONAL EXAMPLES

In the following section, examples are provided.

Example 1: A method comprising: providing, as an input to an assisted-driving system or an automated-driving system at least partially in control of a vehicle traveling on a road, an initial lane segment; determining, using location data for the vehicle, a position of the vehicle; maintaining, based on the position of the vehicle and map data, a current lane segment for the vehicle, the current lane segment being the initial lane segment; determining, using the position of the vehicle and the map data, a relative position of the vehicle within the current lane segment; determining, based on the relative position of the vehicle within the current lane segment, whether or not to transition the current lane segment to be another lane segment; responsive to determining to transition the current lane segment to be the other lane segment, setting the current lane segment to be the other lane segment; and providing the current lane segment as the input to the assisted-driving system or the automated-driving system of the vehicle.

Example 2: The method of any preceding example, the method further comprising: generating, based on the map data, a road model for the road, the road model including a series of lane segment groups, lane segments, and lane lines for the road, the lane segments representing a portion of a lane of the road, the lane segment groups representing one or more lane segments for lanes of the road with traffic traveling in the same direction, and the lane lines representing lateral centers of respective lane segments; and providing the road model as an additional input to the assisted-driving system or the automated-driving system of the vehicle to further enable assisted or automated driving of the vehicle within different parts of the road.

Example 3: The method of any preceding example, the method further comprising: determining the lane lines of respective lane segments from multiple centerline points associated with the respective lane segments; and associating landmarks to respective lane segments or lane segment groups at respective offsets, the landmarks including at least one of stop signs, curve entry, curve exit, speed limit signs, or parking spots.

Example 4: The method of any preceding example, wherein the relative position of the vehicle within the current lane segment includes a lateral offset to a lane line of the current lane segment.

Example 5: The method of any preceding example, wherein determining whether or not to transition the current lane segment to be another lane segment comprises: determining, based on the lateral offset to the lane line of the current lane segment, whether to transition the current lane segment to be a left-adjacent lane segment or a right-adjacent lane segment.

Example 6: The method of any preceding example, wherein: determining to transition the current lane segment to be the left-adjacent lane segment is responsive to determining that the lateral offset to the lane line of the current lane segment is larger than a left-adjacent-lane offset, the left-adjacent-lane offset representing a lateral distance between a lane line of the left-adjacent lane segment and the position of the vehicle; and determining to transition the current lane segment to be the right-adjacent lane segment is responsive to determining that the lateral offset to the lane line of the current lane segment is larger than a right-adjacent-lane offset, the right-adjacent-lane offset representing a lateral distance between a lane line of the right-adjacent lane segment and the position of the vehicle.

Example 7: The method of any preceding example, wherein at least one of: the lateral offset to the lane line of the current lane segment is determined based on linear interpolation to two nearest centerline points for the lane line of the current lane segment; the leftadjacent-lane offset is determined based on linear interpolation to two nearest centerline points for the lane line of the left-adjacent lane segment; or the right-adjacent-lane offset is determined based on linear interpolation to two nearest centerline points for the lane line of the right-adjacent lane segment.

Example 8: The method of any preceding example, wherein the relative position of the vehicle within the current lane segment includes a longitudinal offset from a beginning of the current lane segment.

Example 9: The method of any preceding example, wherein determining whether or not to transition the current lane segment to be another lane segment comprises: determining, based on the longitudinal offset from the beginning of the current lane segment, whether to transition the current lane segment to be a next lane segment.

Example 10: The method of any preceding example, wherein determining whether to transition the current lane segment to be the next lane segment comprises comparing the longitudinal offset from the beginning of the current lane segment to a position of a last centerline point for the current lane segment.

Example 11: The method of any preceding example, the method further comprising: obtaining, from one or more map providers, the map data in one or more formats associated with the map providers, wherein generating the road model comprises generating the road model to receive the map data in at least one other format that is independent of the one or more formats associated with the map providers.

Example 12: The method of any preceding example, wherein the location data includes position data of the vehicle from at least one sensor and the position data can be used to determine the relative position of the vehicle to the lane lines.

Example 13: The method of any preceding example, wherein the assisted-driving system or the automated-driving system comprises at least one of an automatic cruise control system, a traffic-jam assist system, a lane-centering assist system, or an L3/L4 autonomous driving on highways system.

Example 14: A processor in a vehicle configured to: provide, as an input to an assisted-driving system or an automated-driving system at least partially in control of a vehicle traveling on a road, an initial lane segment; determine, using location data for the vehicle, a position of the vehicle; maintain, based on the position of the vehicle and map data, a current lane segment for the vehicle, the current lane segment being the initial lane segment; determine, using the position of the vehicle and the map data, a relative position of the vehicle within the current lane segment; determine, based on the relative position of the vehicle within the current lane segment, whether or not to transition the current lane segment to be another lane segment; responsive to a determination to transition the current lane segment to be the other lane segment, set the current lane segment to be the other lane segment; and provide the current lane segment as the input to the assisted-driving system or the automated-driving system of the vehicle.

Example 15: The processor of example 14, the processor further configured to: generate, based on the map data, a road model for the road, the road model including a series of lane segment groups, lane segments, and lane lines for the road, the lane segments representing a portion of a lane of the road, the lane segment groups representing one or more lane segments for lanes of the road with traffic traveling in the same direction, and the lane lines representing lateral centers of respective lane segments; and provide the road model as an additional input to the assisted-driving system or the automated-driving system of the vehicle to further enable assisted or automated driving of the vehicle within different parts of the road.

Example 16: The processor of example 14 or 15, wherein the processor determines whether or not to transition the current lane segment to be another lane segment by: determining, based on a lateral offset to a lane line of the current lane segment, whether to transition the current lane segment to be a left-adjacent lane segment or a right-adjacent lane segment.

Example 17: The processor of any one of examples 14 through 16, wherein the processor: determines to transition the current lane segment to be the left-adjacent lane segment responsive to a determination that the lateral offset to the lane line of the current lane segment is larger than a left-adjacent-lane offset, the left-adjacent-lane offset representing a lateral distance between a lane line of the left-adjacent lane segment and the position of the vehicle; and determines to transition the current lane segment to be the right-adjacent lane segment responsive to a determination that the lateral offset to the lane line of the current lane segment is larger than a right-adjacent-lane offset, the right-adjacent-lane offset representing a lateral distance between a lane line of the right-adjacent lane segment and the position of the vehicle.

Example 18: The processor of any one of examples 14 through 17, wherein the processor determines whether or not to transition the current lane segment to be a next lane segment by: determining a longitudinal offset from a beginning of the current lane segment; and determining, based on the longitudinal offset from a beginning of the current lane segment, whether the relative position of the vehicle extends beyond a position of a last centerline point for the current lane segment.

Example 19: The processor of any one of examples 14 through 18, wherein processor is further configured to: obtain, from one or more map providers, the map data in one or more formats associated with the map providers, wherein generation of the road model comprises generating the road model to receive the map data in at least one other format that is independent of the one or more formats associated with the map providers.

Example 20: A computer-readable storage media comprising computer-executable instructions that, when executed, cause a processor in a vehicle to: provide, as an input to an assisted-driving system or an automated-driving system at least partially in control of a vehicle traveling on a road, an initial lane segment; determine, using location data for the vehicle, a position of the vehicle; maintain, based on the position of the vehicle and map data, a current lane segment for the vehicle, the current lane segment being the initial lane segment; determine, using the position of the vehicle and the map data, a relative position of the vehicle within the current lane segment; determine, based on the relative position of the vehicle within the current lane segment, whether or not to transition the current lane segment to be another lane segment; responsive to a determination to transition the current lane segment to be the other lane segment, set the current lane segment to be the other lane segment; and provide the current lane segment as the input to the assisted-driving system or the automated-driving system of the vehicle.

Example 21: A system comprising means for performing the method of any preceding example.

Example 22: A system comprising a processor configured to perform the method of any preceding example.

Example 23: A computer-readable storage media comprising computer-executable instructions that, when executed, cause a processor in a vehicle to perform the method of any preceding example.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method comprising:
   providing, as an input to an assisted-driving system or an automated-driving system at least partially in control of a vehicle traveling on a road, an initial lane segment;
   determining, using location data for the vehicle, a position of the vehicle;
   maintaining, based on the position of the vehicle and map data, a current lane segment for the vehicle, the current lane segment being the initial lane segment;
   determining, using the position of the vehicle and the map data, a relative position of the vehicle within the current lane segment;
   determining, based on the relative position of the vehicle within the current lane segment, whether or not to transition the current lane segment to be another lane segment;
   responsive to determining to transition the current lane segment to be the other lane segment, setting the current lane segment to be the other lane segment;
   providing the current lane segment as the input to the assisted-driving system or the automated-driving system of the vehicle;
   generating, based on the map data, a road model for the road, the road model including a series of lane segment groups, lane segments, and lane lines for the road, the lane segments representing a portion of a lane of the road, the lane segment groups representing one or more lane segments for lanes of the road with traffic traveling in the same direction, and the lane lines representing lateral centers of respective lane segments; and
   providing the road model as an additional input to the assisted-driving system or the automated-driving system of the vehicle to further enable assisted or automated driving of the vehicle within different parts of the road.

2. The method of claim 1, the method further comprising:
   determining the lane lines of respective lane segments from multiple centerline points associated with the respective lane segments; and
   associating landmarks to respective lane segments or lane segment groups at respective offsets, the landmarks including at least one of stop signs, curve entry, curve exit, speed limit signs, or parking spots.

3. The method of claim 1, wherein the relative position of the vehicle within the current lane segment includes a lateral offset to a lane line of the current lane segment.

4. The method of claim 3, wherein determining whether or not to transition the current lane segment to be another lane segment comprises:
   determining, based on the lateral offset to the lane line of the current lane segment, whether to transition the current lane segment to be a left-adjacent lane segment or a right-adjacent lane segment.

5. The method of claim 4, wherein:
   determining to transition the current lane segment to be the left-adjacent lane segment is responsive to determining that the lateral offset to the lane line of the current lane segment is larger than a left-adjacent-lane offset, the left-adjacent-lane offset representing a lateral distance between a lane line of the left-adjacent lane segment and the position of the vehicle; and
   determining to transition the current lane segment to be the right-adjacent lane segment is responsive to determining that the lateral offset to the lane line of the current lane segment is larger than a right-adjacent-lane offset, the right-adjacent-lane offset representing a lateral distance between a lane line of the right-adjacent lane segment and the position of the vehicle.

6. The method of claim 5, wherein at least one of:
   the lateral offset to the lane line of the current lane segment is determined based on linear interpolation to two nearest centerline points for the lane line of the current lane segment;
   the left-adjacent-lane offset is determined based on linear interpolation to two nearest centerline points for the lane line of the left-adjacent lane segment; or
   the right-adjacent-lane offset is determined based on linear interpolation to two nearest centerline points for the lane line of the right-adjacent lane segment.

7. The method of claim 1, wherein the relative position of the vehicle within the current lane segment includes a longitudinal offset from a beginning of the current lane segment.

8. The method of claim 7, wherein determining whether or not to transition the current lane segment to be another lane segment comprises:
   determining, based on the longitudinal offset from the beginning of the current lane segment, whether to transition the current lane segment to be a next lane segment.

9. The method of claim 8, wherein determining whether to transition the current lane segment to be the next lane segment comprises comparing the longitudinal offset from the beginning of the current lane segment to a position of a last centerline point for the current lane segment.

10. The method of claim 1, the method further comprising:
    obtaining, from one or more map providers, the map data in one or more formats associated with the map providers,
    wherein generating the road model comprises generating the road model to receive the map data in at least one other format that is independent of the one or more formats associated with the map providers.

11. The method of claim 1, wherein the location data includes position data of the vehicle from at least one sensor and the position data can be used to determine the relative position of the vehicle to the lane lines.

12. The method of claim 1, wherein the assisted-driving system or the automated-driving system comprises at least one of an automatic cruise control system, a traffic-jam assist system, a lane-centering assist system, or an L3/L4 autonomous driving on highways system.

13. A processor in a vehicle configured to:
provide, as an input to an assisted-driving system or an automated-driving system at least partially in control of a vehicle traveling on a road, an initial lane segment;
determine, using location data for the vehicle, a position of the vehicle;
maintain, based on the position of the vehicle and map data, a current lane segment for the vehicle, the current lane segment being the initial lane segment;
determine, using the position of the vehicle and the map data, a relative position of the vehicle within the current lane segment;
determine, based on the relative position of the vehicle within the current lane segment, whether or not to transition the current lane segment to be another lane segment;
responsive to a determination to transition the current lane segment to be the other lane segment, set the current lane segment to be the other lane segment;
provide the current lane segment as the input to the assisted-driving system or the automated-driving system of the vehicle;
generate, based on the map data, a road model for the road, the road model including a series of lane segment groups, lane segments, and lane lines for the road, the lane segments representing a portion of a lane of the road, the lane segment groups representing one or more lane segments for lanes of the road with traffic traveling in the same direction, and the lane lines representing lateral centers of respective lane segments; and
provide the road model as an additional input to the assisted-driving system or the automated-driving system of the vehicle to further enable assisted or automated driving of the vehicle within different parts of the road.

14. The processor of claim 13, wherein the processor determines whether or not to transition the current lane segment to be another lane segment by:
determining, based on a lateral offset to a lane line of the current lane segment, whether to transition the current lane segment to be a left-adjacent lane segment or a right-adjacent lane segment.

15. The processor of claim 14, wherein the processor:
determines to transition the current lane segment to be the left-adjacent lane segment responsive to a determination that the lateral offset to the lane line of the current lane segment is larger than a left-adjacent-lane offset, the left-adjacent-lane offset representing a lateral distance between a lane line of the left-adjacent lane segment and the position of the vehicle; and
determines to transition the current lane segment to be the right-adjacent lane segment responsive to a determination that the lateral offset to the lane line of the current lane segment is larger than a right-adjacent-lane offset, the right-adjacent-lane offset representing a lateral distance between a lane line of the right-adjacent lane segment and the position of the vehicle.

16. The processor of claim 13, wherein the processor determines whether or not to transition the current lane segment to be a next lane segment by:
determining a longitudinal offset from a beginning of the current lane segment; and
determining, based on the longitudinal offset from a beginning of the current lane segment, whether the relative position of the vehicle extends beyond a position of a last centerline point for the current lane segment.

17. The processor of claim 13, wherein processor is further configured to:
obtain, from one or more map providers, the map data in one or more formats associated with the map providers,
wherein generation of the road model comprises generating the road model to receive the map data in at least one other format that is independent of the one or more formats associated with the map providers.

18. A computer-readable storage media comprising computer-executable instructions that, when executed, cause a processor in a vehicle to:
provide, as an input to an assisted-driving system or an automated-driving system at least partially in control of a vehicle traveling on a road, an initial lane segment;
determine, using location data for the vehicle, a position of the vehicle;
maintain, based on the position of the vehicle and map data, a current lane segment for the vehicle, the current lane segment being the initial lane segment;
determine, using the position of the vehicle and the map data, a relative position of the vehicle within the current lane segment, including a longitudinal offset from a beginning of the current lane segment;
determine, based on the relative position of the vehicle within the current lane segment, whether or not to transition the current lane segment to be another lane segment, wherein determining whether or not to transition the current lane segment to be another lane segment further includes determining, based on the longitudinal offset from the beginning of the current lane segment, whether to transition the current lane segment to be a next lane segment, wherein determining whether to transition the current lane segment to be the next lane segment further includes comparing the longitudinal offset from the beginning of the current lane segment to a position of a last centerline point for the current lane segment;
responsive to a determination to transition the current lane segment to be the other lane segment, set the current lane segment to be the other lane segment; and
provide the current lane segment as the input to the assisted-driving system or the automated-driving system of the vehicle.

* * * * *